United States Patent [19]

Davis

[11] 3,939,328

[45] Feb. 17, 1976

[54] CONTROL SYSTEM WITH ADAPTIVE PROCESS CONTROLLERS ESPECIALLY ADAPTED FOR ELECTRIC POWER PLANT OPERATION

[75] Inventor: Guy E. Davis, Martinez, Calif.

[73] Assignee: Westinghouse Electric Corporation, Pittsburgh, Pa.

[22] Filed: Nov. 6, 1973

[21] Appl. No.: 413,272

[52] U.S. Cl. .............. 235/150.1; 290/40 R; 60/660; 318/609

[51] Int. Cl.² F01K 7/16; F01D 17/00; G05B 11/42

[58] Field of Search ...................... 235/150.1; 290/40

[56] References Cited

UNITED STATES PATENTS

| | | | |
|---|---|---|---|
| 2,946,943 | 7/1960 | Nye et al. | 318/448 |
| 3,391,317 | 7/1968 | Bell | 318/610 |
| 3,446,224 | 5/1969 | Zwicky | 290/40 UX |
| 3,493,826 | 2/1970 | Wandrey | 318/621 X |
| 3,510,737 | 5/1970 | Brown et al. | 318/621 X |
| 3,519,807 | 7/1970 | Jacques et al. | 235/151.1 |
| 3,613,419 | 10/1971 | Silva | 72/8 |
| 3,622,767 | 11/1971 | Koepcke | 235/150.1 |
| 3,696,282 | 10/1972 | Hirokawa et al. | 318/588 |
| 3,741,474 | 6/1973 | Kawada et al. | 235/150.1 |
| 3,782,113 | 1/1974 | Luongo | 290/40 X |

*Primary Examiner*—Eugene G. Botz
*Attorney, Agent, or Firm*—E. F. Possessky

[57] ABSTRACT

An electric power plant including a steam generator and a steam turbine is operated by a control system including a turbine control, a boiler control and a plant unit master; each of the aforementioned controls includes integrating or adaptive controllers responsive to error signals to effect a desired control and ramp generators to provide an output against which a control process may be tracked. The integrating controllers include an integrating circuit for integrating an input error signal and a proportional circuit responsive to the error signal for providing an output signal to be summed with the output of the integrating circuit. The constant of the proportional circuit and the time constant of the integrating circuit are changed as a function of an index. In a control for an electric power plant, the index is the load reference provided by the plant unit master. A ramp generator is suggested that is capable of generating linear ramps at a fixed rate toward a known value, e.g. the control reference to be entered, and includes an integrating circuit to which is selectively applied first and second reference signals dependent upon whether the input signal is above or below a predetermined level.

28 Claims, 24 Drawing Figures

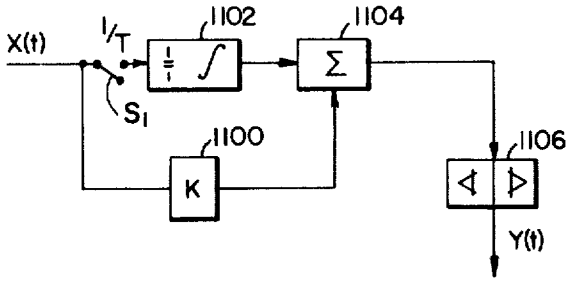
FIG.15A
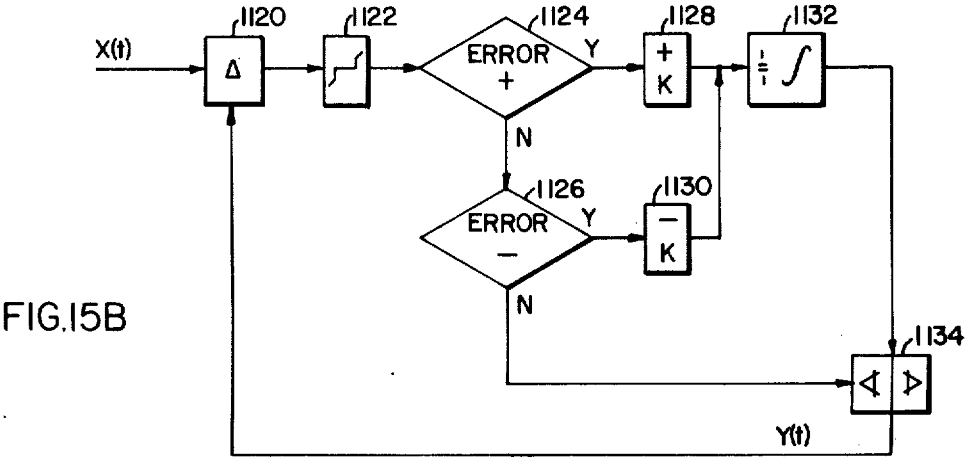
FIG.15B
FIG.15C
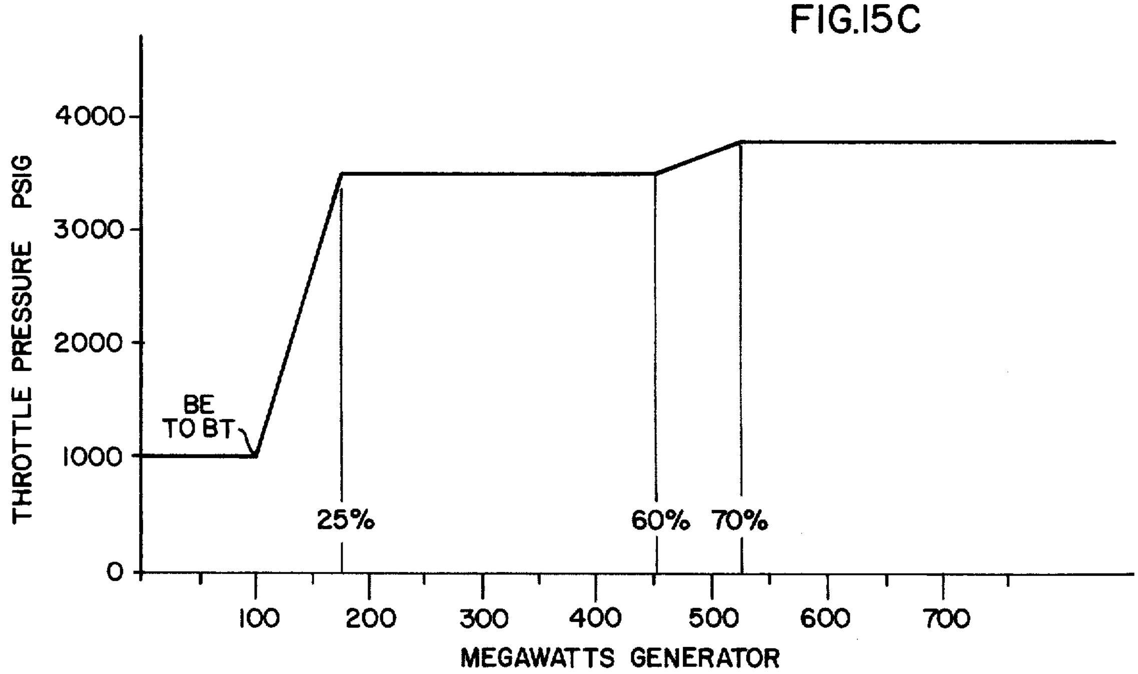

CONTROL SYSTEM WITH ADAPTIVE PROCESS CONTROLLERS ESPECIALLY ADAPTED FOR ELECTRIC POWER PLANT OPERATION

CROSS-REFERENCE TO RELATED APPLICATIONS

The following co-assigned patent applications are hereby incorporated by reference:

1. Ser. No. 250,826, entitled "A Digital Computer Monitored And/Or Operated System Or Process Which Is Structured For Operation With An Improved Automatic Programming Process and System" filed by J. Gomola et al. on May 5, 1972.
2. Ser. No. 247,877, entitled "System And Method For Starting, Synchrnoizing And Operating A Steam Turbine With Digital Computer Control" filed by T. Giras et al. on Apr. 26, 1972.
3. Ser. No. 306,752, entitled "System And Method Employing Valve Management For Operating A Steam Turbine" filed by T. Giras et al. in Nov. 15, 1972.
4. Ser. No. 413,291, entitled "Plant Unit Master Control For Fossil Fired Boiler Implemented With A Digital Computer" filed by G. Davis and J. Smith concurrently herewith.
5. Ser. No. 413,275, entitled "Electric Power Plant Having a Multiple Computer System For Redundant Control Of Turbine And Steam Generator" filed by T. Giras, W. Mendez and J. Smith concurrently herewith.

The following co-assigned patent applications are filed herewith and are referenced as related applications:

1. Ser. No. 413,277, entitled "Protection System For Transferring Turbine And Steam Generator Operation To A Backup Mode Especially Adapted For Multiple Computer Electric Power Plant Control Systems" filed by G. Davis concurrently herewith.
2. Ser. No. 413,271 entitled "A Multiple Computer System For Operating A Power Plant Turbine With Manual Backup Capability" filed by G. Davis, R. Hoover and W. Ghrist concurrently herewith.
3. Ser. No. 413,274, entitled "A System For Initializing A Backup Computer In A Multiple Electric Power Plant And Turbine Control System To Provide Turbine And Plant Operation With Reduced Time For Backup Computer Availability" filed by G. Davis concurrently herewith.
4. Ser. No. 413,272, entitled "A System For Manually Or Automatically Transferring Control Between Computers Without Power Generation Disturbance In An Electric Power Plant Or Steam Turbine Operated By A Multiple Computer Control System" filed by G. Davis concurrently herewith.
5. Ser. No. 413,273, entitled "Wide Load Range System For Transferring Turbine Or Plant Operation Between Computers In A Multiple Computer Turbine And Power Plant Control System" filed by G. Davis, F. Lardi and W. Ghrist concurrently herewith.
6. Ser. No. 413,276 entitled "Wide Speed Range System For Transferring Turbine Operation Between Computers In A Multiple Turbine Computer Control System" filed by D. Jones and G. Davis concurrently herewith.

BACKGROUND OF THE INVENTION

1. Field of the Invention

The present invention relates to the operation of steam turbines and electric power plants and more particularly to the implementation of adaptive control techniques to assure the positive and accurate control of steam turbines and electric power plants.

2. Description of the Prior Art

In order to meet the increasing demands for the generation of electrical power, electric plants including boilers and turbines of increased size have been incorporated into power generating systems including an increasing number of interconnected plants. As larger units and greater numbers of such units are placed into service to meet ever-increasing power energy requirements, the control of power generation of each unit required improvement in order to achieve good frequency control over the entire system. In addition to systems requirements, there was a strong requirement that new methods be developed to extract energy from the boiler as well as to set limits by which the boiler could be operated safely and efficiently. As discussed in the article, "System Design Considerations For Advanced Utility Unit Control," by T. A. Rumsey and D. L. Armstrong, presented at the 14th Annual Southeastern ISA Conference, April of 1968, the required improved control of power generation is efficiently accomplished by achieving a close coordination of the boiler and turbine controls. As suggested in this article, the controls for the boiler and turbine are placed in parallel in a manner similar to the boiler follow system, except that the steam pressure is varied to take advantage of the energy stored in the boiler. The turbine regulates steam pressure, but with a changing set point derived from the error between load demand and actual unit output. If the load demand is higher than the actual unit output, the signal applied to the pressure controller calls for a lower steam pressure, thus opening the governor valve and temporarily increasing megawatts as the pressure drops. The same signal applied to the pressure controller effecting a lower pressure in response to detection of a megawatts output below the required demand level, increases the boiler inputs (water, air and fuel). This control action continues until the megawatt error is zero, at which time the steam pressure is at its normal value. Such integrated control techniques have been applied to once-through, supercritical boilers and to drum-type sub-critical boilers.

A significant aspect of the integrated control of turbines and boilers is the use of feed forward control techniques to minimize interaction and to extract the best possible dynamic response. Generally, such feed forward control is effected by applying load demand signals from either the ADS, a computer, or a manual operator control, simultaneously to the boiler and turbine. The advantages of such a control means that subloop process changes are made simultaneously with load changes before subloop errors exist. Feedback controllers are used as a final trim on the process subloop to correct for minor non-linearities and static effects. The trimmed or modified load references are applied, in turn, to the boiler and turbine controls. As a result, it is possible to extract energy more efficiently from the boiler of an individual unit, whereas on a system level, each of a plurality of units may be operated so as to maintain system frequency integrity.

As described in an article entitled "Digital Control Techniques For Plant Applications" by Theodore Giras and Robert Uram, *Combustion*, March 1969, such coordinated schemes of generating power require improved techniques of digital control including nonlinear feed forward characterization of major plant variables such as load demand, boiler demand, feedwater demand, fuel demand and air demand; calibration of the feed forward control action by measured variables such as pressure, temperatures and flows; adaptive controllers sensitive to real plant variables and adjusted to operate over the entire range from no load to full load; minor-loop feed-back control which is coordinated throughout the entire system; and finally, logical interaction of all control loops to ensure bumpless transfer from manual to automatic, and from automatic to manual, modes of operation.

The wide range of controllability required for the steam plants of today suggests the use of high-speed digital controllers to implement the sophisticated control philosophy necessary for proper operation.

There are a number of basic requirements which a digital system must satisfy in order to control a complex process. First is the ability to alter or modify the control package easily and quickly in the field to accommodate process dynamic characteristics which could not be anticipated early in the design. In addition to this block flexibility, the digital package must be designed so that process parameters can be changed quickly and accurately. Thus, plant gains, biases, set points, limits, time constants and other important system data must be arranged in the computer storage in such a fashion that inexperienced field personnel may adjust these values literally at will. This is of paramount importance, for as more is learned over a period of time in controlling a plant with a computer, refinements in the control system must be made to improve operating efficiency and reliability.

Another major requirement of a digital system is careful selection of the computing schemes used in the various controllers and functional blocks. Since all implementation within the computer must ultimately be done with numerical methods, the general formulation and selection of any algorithm structure becomes quite critical. Thus, the numerical schemes for integration, differentiation, smoothing, and characterization must be carefully selected to assure proper control action, and yet be simply and easily programmed.

Dynamic or integrated controllers have been used to implement the various methods of calculation to achieve the desired control action. Such controllers may take the form of a reset, rate, proportional plus reset, proportional plus rate, and proportional plus reset plus rate-type controller. Such controllers may be used either on-line or off-line to provide a direct output for control or to provide a trim of a reference demand. As described in the article entitled "Hybrid Digital-Analog Power Plant Control" by Guy E. Davis, Jr., ISA Transactions, 1970, such controllers may be used in conjunction with a manual/auto station for the control of a typical valve within a boiler. While operating on Manual, the output of the transducer associated with the valve is applied to a computer, which must track the operator's adjustment to the control. The term "track" connotes the process by which the computer forces its calculated output to match the present manual station demand for valve position and transfer from Manual to Auto without bumping the process. In order to ensure a bumpless transfer between the Manual and Auto Modes of operation, the operator may balance the process to the correct setting before transferring from Manual to Auto. For that type of control, the operator uses a null meter on the manual station to determine process balance. More recent electronic systems use tracking amplifiers to modify the demand signal to agree with the actual operating set point. After balance is achieved and transfer occurs, the tracking amplifiers' off-set is made to decay to a neutral value. This method was applied in a computer control program as one form of bumpless transfer. The use of controllers in such bumpless transfer systems has proved effective in boiler control systems.

Considering that one of the purposes of operating in a coördinated mode is to achieve a more accurate frequency control over the power plant so that the single power plant may be coordinated more effectively with the plants of the entire system, it is desirable to effect a more positive control over the various parameters of turbine and boiler operation whereby the power generated and its frequency likewise are positively controlled. To accomplish this overall objective of improved power generation, it is desirable to provide new and improved controllers of increased flexibility in terms that their time constants or gains may be adjusted readily and that their response to inputs may be controlled readily as to rate of change and as to accuracy of response according to a desired function to varying inputs.

SUMMARY OF THE INVENTION

An electric power plant comprises one or more turbines, a steam generator and a control system including a plant unit master for applying a load reference to a boiler control and a turbine control. In such a control system, there are included integrating controllers comprising an integrating circuit and a proportional circuit. In a control process, an error signal is developed and applied to the integrating circuit and proportional circuit; the outputs therefrom are summed and applied to effect the control of a function within the electric power plant. To ensure more precise control over the electric power plant, means are provided for varying the proportional constant and the time constant of the integrating circuit according to the process to be controlled. Further, the control system may include a ramp generator for generating an increasing or decreasing ramp in response to an input signal until the ramp has reached a value equal to that of the input signal. In this manner, a reference value is entered toward which the ramping signal proceeds at a fixed rate independent of the input reference signal.

BRIEF DESCRIPTION OF THE DRAWINGS

These and other objects and advantages of the present invention will become more apparent by referring to the following detailed description and accompanying drawings, in which:

FIG. 15A is a schematic drawing of a further integrating controller in accordance with the teachings of this invention;

FIG. 15B is a schematic drawing of a ramp generator in accordance with the teachings of this invention; and FIG. 15C is a calibration curve capable of being implemented by the function generators of the integrating controller of FIG. 10.

DESCRIPTION OF THE PREFERRED EMBODIMENT

Electric Power Plant and Steam Turbine System

Figure 1:
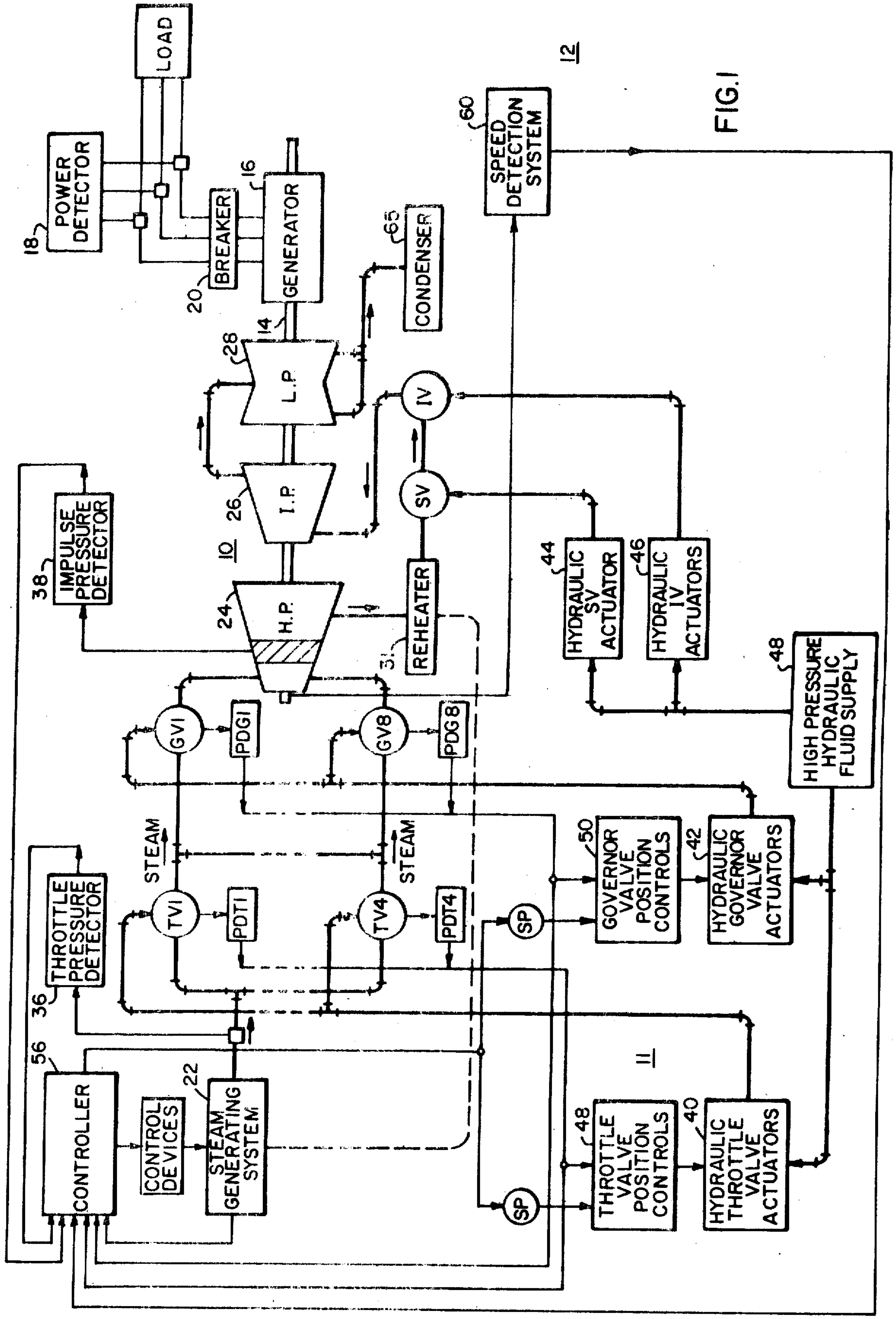
FIG. 1A shows a schematic block diagram of an electric power plant which is operated by a control system in accordance with the principles of the invention.
FIG. 1B shows a schematic view of a once-through boiler employed in the plant of FIG. 1A, with portions of the boiler cut away.
FIG. 1C shows a process flow diagram for the electric power plant of FIG. 1A.

More specifically, there is shown in FIG. 1A a large single reheat steam turbine 10 and a steam generating system 22 constructed in a well known manner and operated by a control system 11 in an electric power plant 12 in accordance with the principles of the invention. The turbine 10 and the turbine control functions are like those disclosed in the cross-referenced Uram copending patent application Ser. No. 247,877 entitled "System For Starting, Synchronizing and Operating a Steam Turbine With Digital Computer Control".

The turbine 10 is provided with a single output shaft 14 which drives a conventional large alternating current generator 16 to produce three-phase electric power sensed by a power detector 18. Typically, the generator 16 is connected through one or more breakers 20 per phase to a large electric power network and when so connected causes the turbo-generator arrangement to operate at synchronous speed under steady state conditions. Under transient electric load change conditions, system frequency may be affected and conforming turbo-generator speed changes would result if permitted by the electric utility control engineers.

After synchronism, power contribution of the generator 16 to the network is normally determined by the turbine steam flow which in this instance is normally supplied to the turbine 10 at substantially constant throttle pressure. The constant throttle pressure steam for driving the turbine 10 is developed by the steam generating system 22 which in this case is provided in the form of a conventional once through type boiler operated by fossil fuel in the form of natural gas or oil. The boiler 22 specifically can be a 750 MW combustion engineering supercritical tangentially fired gas and oil fuel once through boiler.

In this case, the turbine 10 is of the multistage axial flow type and it includes a high pressure section 24, an intermediate pressure section 26, and a low pressure section 28 which are designed for fossil plant operation. Each of the turbine sections may include a plurality of expansion stages provided by stationary vanes and an interacting bladed rotor connected to the shaft 14.

As shown in FIG. 1B, the once-through boiler 22 includes walls 23 along which vertically hung waterwall tubes 25 are distributed to pass preheated feedwater from an economizer 27 to a superheater 29. Steam is directed from the superheater 29 to the turbine HP section 26 and steam from the HP section 26 is redirected to the boiler 22 through reheater tubes 31 and back to the turbine IP section 26. The feedwater is elevated in pressure and temperature in the waterwall tubes 25 by the heat produced by combustion in approximately the lower half of the furnace interior space.

Five levels of burners are provided at each of the four corners of the furnace. The general load operating level of the plant determines how many levels of burners are in operation, and the burner fuel flow is placed under control to produce particular load levels. At any one burner level, both gas and oil burners are provided but only one type of burner is normally operated at any one time.

Combustion air is preheated by the exhaust gases and enters the furnace near the furnace corners through four inlet ducts 19-1 under the driving force of four large fans. Air flow is basically controlled by positioning of respective dampers in the inlet ducts.

Hot products of combustion pass vertically upward through the furnace to the superheater 29. The hot exhaust gases then pass through the reheater tube 31 and then through the feedwater economizer 27 and an inlet air heat exchanger 33 in an exhaust duct 19-2 prior to being exhausted in the atmosphere through a large stack.

In FIG. 1C, there is shown a schematic process flow diagram which indicates how the plant working fluid is energized and moved through the turbine 10 to operate the generator 16 and produce electric power. Thus, gas or other fuel is supplied to burners 35 through main valves 37 or bypass valves 39. Air for combustion is supplied through the preheaters 33 and air registers to the combustion zone by fans 41 under flow control by dampers 43.

Feedwater is preheated by heaters 61 and flows under pressure produced by boiler feedwater pumps 63 to the economizer 27 and waterwall tubes 25 through valve FW or startup valve FWB. Heat is transferred to the working fluid in the economizer 27 and waterwall tubes 25 as indicated by the reference character 45. Next, the working fluid flows to the superheater 29 comprising a primary superheater 47, a desuperheater 49 to which cooling spray can be applied through a valve 51, and a final superheater 53. Heat is added to the working fluid as indicated by the reference character 55 in the superheaters 29. Valves BT and BTB pass the working fluid to the superheater 29 after boiler startup, and valves BE, SA, ST and WD cooperate with a flash tank 57 and a condenser 65 to separate steam and water flows and regulate superheater working fluid flow during boiler startup.

Boiler outlet steam flows from the final superheater 53 through the turbine inlet throttle and governor valves to the turbine HP section 24. The steam is then reheated in the reheater 31 as indicated by the reference character 59 and passed through the IP and LP turbine section 26 and 28 to the condenser 65. Condenser pumps 67 and 69 then drive the return water to the boiler feed pump 63 through condensate and hydrogen cooling systems, and makeup water is supplied through a demineralizer treatment facility.

The fossil turbine 10 in this instance employs steam chests of the double ended type, and steam flow is directed to the turbine steam chests (not specifically indicated) through four main inlet valves or throttle inlet valves TV1–TV4. Steam is directed from the admission steam chests to the first high pressure section expansion stage through eight governor inlet valves GV1–GV8 which are arranged to supply steam to inlets arcuately spaced about the turbine high pressure casing to constitute a somewhat typical governor valve arrangement for large fossil fuel turbines. Nuclear turbines on the other hand typically utilize only four governor valves. Generally, various turbine inlet valve configurations can involve different numbers and/or arrangements of inlet valves.

In applications where the throttle valves have a flow control capability, the governor valves GV1–GV8 are typically all fully open during all or part of the startup process and steam flow is then varied by full arc throttle valve control. At some point in the startup and loading process, transfer is normally and preferably automatically made from full arc throttle valve control to full arc governor valve control because of throttling energy losses and/or reduced throttling control capability. Upon transfer, the throttle valves TV1–TV4 are fully open, and the governor valves GV1–GV8 are positioned to produce the steam flow existing at transfer. After sufficient turbine heating has occurred, the operator would typically transfer from full arc governor valve control to partial arc governor valve control to obtain improved heating rates.

In instances where the main steam inlet valves are stop valves without flow control capability as is often the case in nuclear turbines, initial steam flow control is achieved during startup by means of a single valve mode of governor valve operation. Transfer can then be made to sequential governor valve operation at an appropriate load level.

In the described arrangement with throttle valve control capability, the preferred turbine startup and loading method is to raise the turbine speed from the turning gear speed of about 2 rpm to about 80 percent of the synchronous speed under throttle valve control, then transfer to full arc governor valve control and raise the turbine speed to the synchronous speed, then close the power system breakers and meet the load demand with full or partial arc governor valve control. On shutdown, governor valve control or coastdown may be employed. Other throttle/governor valve transfer practice may be employed but it is unlikely that transfer would be made at a loading point above 40 percent rated load because of throttling efficiency considerations.

Similarly, the conditions for transfer between full arc and partial arc governor valve control modes can vary in other applications of the invention. For example, on a hot start it may be desirable to transfer from throttle valve control directly to partial arc governor valve control at about 80 percent synchronous speed.

After the steam has crossed past the first stage impulse blading to the first stage reaction blading of the high pressure section 24, it is directed to the reheater 31 as previously described. To control the flow of reheat steam, one or more reheat stop valves SV are normally open and closed only when the turbine is tripped. Interceptor valves IV (only one indicated), are also provided in the reheat steam flow path.

A throttle pressure detector 36 of suitable conventional design senses the steam throttle pressure for data monitoring and/or turbine or plant control purposes. As required in nuclear or other plants, turbine control action can be directed to throttle pressure control as well as or in place of speed and/or load control.

In general, the steady state power or load developed by a steam turbine supplied with substantially constant throttle pressure steam is proportional to the ratio of first stage impulse pressure to throttle pressure. Where the throttle pressure is held substantially constant by external control, the turbine load is proportional to the first stage impulse pressure. A conventional pressure detector 38 is employed to sense the first stage impulse pressure for assigned control usage in the turbine part of the control 11.

A speed detection system 60 is provided for determining the turbine shaft speed for speed control and for frequency participation control purposes. The speed detector 60 can for example include a reluctance pickup (not shown) magnetically coupled to a notched wheel (not shown) on the turbo-generator shaft 14. In the present case, a plurality of sensors are employed for speed detection.

Respective hydraulically operated throttle valve actuators 40 and governor valve actuators 42 are provided for the four throttle valves TV1–TV4 and the eight governor valves GV1–GV8. Hydraulically operated actuators 44 and 46 are also provided for the reheat stop and interceptor valves SV and IV. A high pressure hydraulic fluid supply 48 provides the controlling fluid for actuator operation of the valves TV1–TV4, GV1–GV8, SV and IV. A lubricating oil system (not shown) is separately provided for turbine plant lubricating requirements.

The inlet valve actuators 40 and 42 are operated by respective electrohydraulic position controls 48 and 50 which form a part of the control system 11. If desired, the interceptor valve actuators 46 can also be operated by a position control (not shown).

Figure 2:
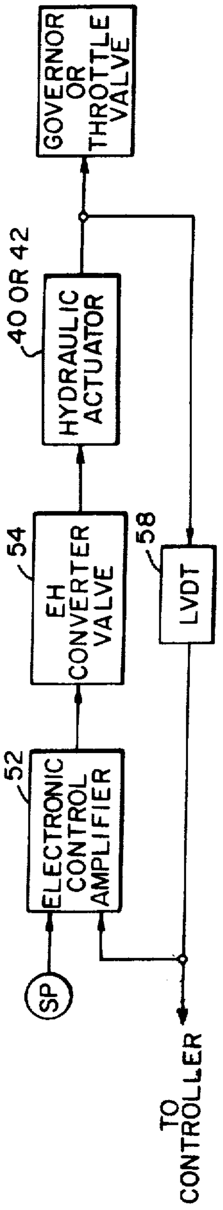
FIG. 2 shows a schematic block diagram of a position control loop for electrohydraulic values employed in a turbine included in the plant of FIG. 1A.

Each turbine valve position control includes a conventional electronic control amplifier 52 (FIG. 2) which drives a Moog valve 54 or other suitable electrohydraulic (EH) converter valve in the well known manner. Since the turbine power is proportional to steam flow under substantially constant throttle pressure, inlet valve positions are controlled to produce control over steam flow as an intermediate variable and over turbine speed and/or load as an end control variable or variables. The actuators position the steam valves in response to output position control signals applied through the EH converters 54. Respective valve position detectors PDT1–PDT4 and PDG1–PDG8 are provided to generate respective valve position feedback signals which are combined with respective valve position setpoint signals SP to provide position error signals from which the control amplifiers 52 generate the output control signals.

The setpoint signals SP are generated by a controller system 56 which also forms a part of the control system 11 and includes multiple control computers and a manual backup control. The position detectors are provided in suitable conventional form, for example they may be linear variable differential transformers 58 (FIG. 2) which generate negative position feedback signals for algebraic summing with the valve position setpoint signals SP.

The combination of the amplifier 52, converter 54, hydraulic actuator 40 or 42, and the associated valve position detector 58 and other miscellaneous devices (not shown) form a local analog electrohydraulic valve position control loop 62 for each throttle or governor inlet steam valve.

Plant Master Control

After the boiler 22 and the turbine 10 are started under manual/automatic control, a plant unit master 71 operates as a part of the computer controller system 56 and coordinates lower level controls in the plant control hierarchy to meet plant load demand in an efficient manner. Thus, in the integrated plant mode, the plant unit master 71 implements plant load demand entered by the operator from a panel 73 or from an automatic dispatch system by simultaneously applying a corresponding turbine load demand to a digital electrohydraulic (DEH) speed and load control 64 for the turbine 10 and a corresponding boiler demand applied to a boiler demand generator 75 for distribution across the various boiler subloops as shown in FIG. 3A to keep the boiler 22 and the turbine 10 in step. Under certain contingency conditions, the plant unit master 71 rejects from integrated control and coordinates the plant operation in either the turbine follow mode or the boiler follow mode. If the plant unit master 71 is not functioning, load is controlled through a boiler demand generator 75 and the turbine load is controlled directly from the operator panel 73.

In some usages, "coordinated control" is equated to "integrated control" which is intended to mean in step or parallel control of a steam generator and a turbine. However, for the purposes of the present patent application, the term coordinated control is intended to embrace the term integrated control and in addition it is intended to refer to the boiler and turbine follow modes of operation in which control is coordinated but not integrated.

Once-Through Boiler Controls

Feedwater flow to the economizer 27 (FIG. 1C) is controlled by setting the speed of the boiler feed pumps 63 and the position of the FW or FWB (startup) valve. Generally, valve stems and other position regulated mechanisms are preferably positioned by use of a conventional electric motor actuator. Air flow is controlled by two speed fans and dampers 41 and fuel flow is controlled by the valves 37, 39.

In the boiler part of the control system 11, first level control for the feedwater pumps 63 and the feedwater valves is provided by a feedwater control 77 which responds to load demand from the boiler demand generator 75 and to process variables so as to keep the feedwater flow dynamicly in line with the load demand. Similarly, first level control is provided for the fans and the fuel valves respectively by an air control 79 and a fuel control 91. Fuel-air ratio is regulated by interaction between the air and fuel controls 79 and 91. The air and fuel controls respond to the boiler demand generator 75 and process variables so that water, fuel and air flows are all kept in step with load demand.

A first level temperature control 93 operates desuperheater and reheater sprays to drop outlet steam temperature as required. A second level temperature control 95 responds to the boiler demand and to process variables to modify the operation of the feedwater and fuel controls 77 and 91 for outlet steam temperature control. Another second level control is a throttle pressure control 97 which modifies turbine and boiler flow demands to hold throttle pressure constant as plant load demand is met.

During startup, the level of the flash tank and the operation of the bypass valves referred to in connection with FIG. 1B are controlled by a boiler separator control system 99. Once the boiler is placed in load operation, the boiler separator control system 97 is removed from control.

Generally, individual boiler control loops and boiler subcontrol loops in the control system 11 can be operated automatically or manually from the panel 73. Where manual control is selected for a lower control level subloop and it negates higher level automatic control, the latter is automatically rejected for that particular subloop and higher control loops in the hierarchy.

Steam Turbine Control Loops

Figure 3B:
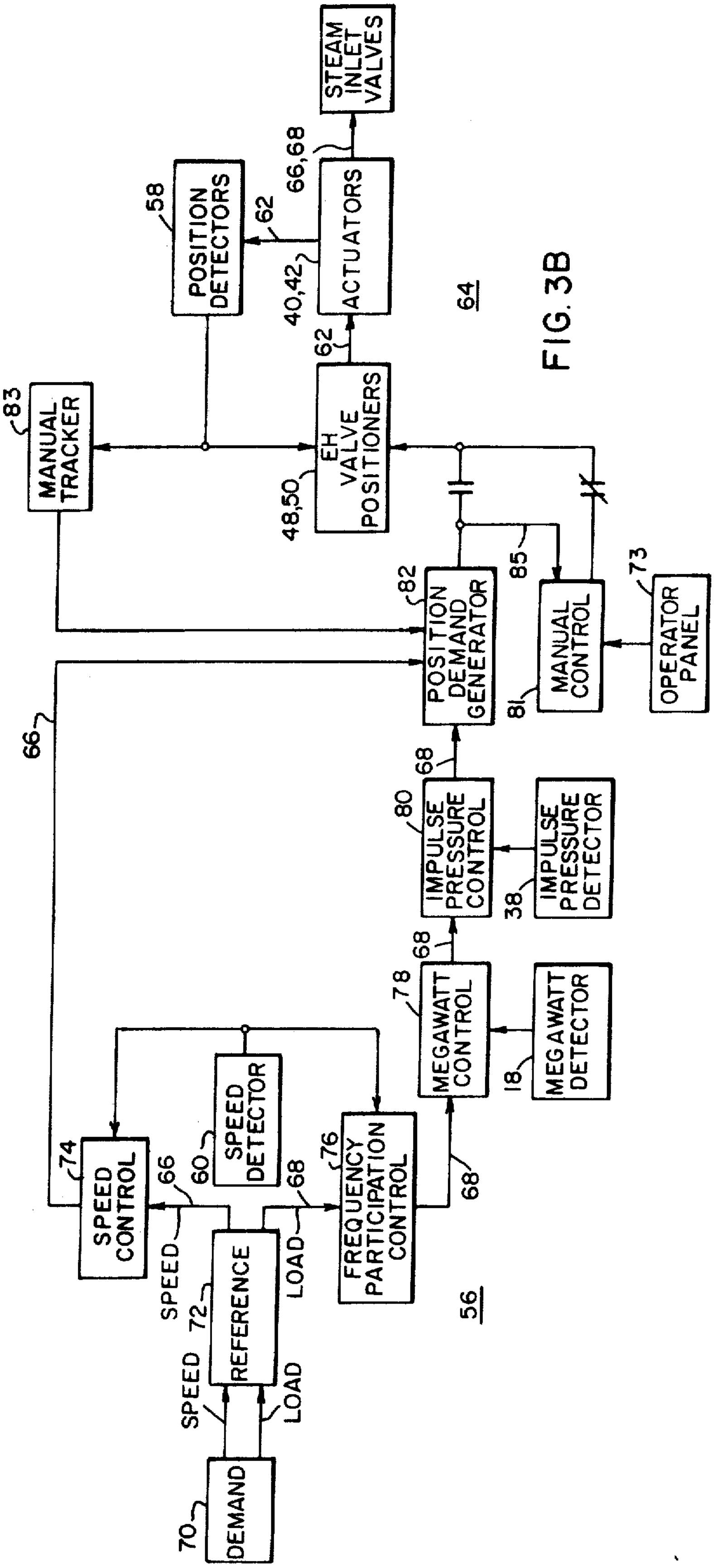
FIG. 3B shows a control loop diagram for the steam turbine in the electric power plant of FIG. 1A.
Figure 3A:
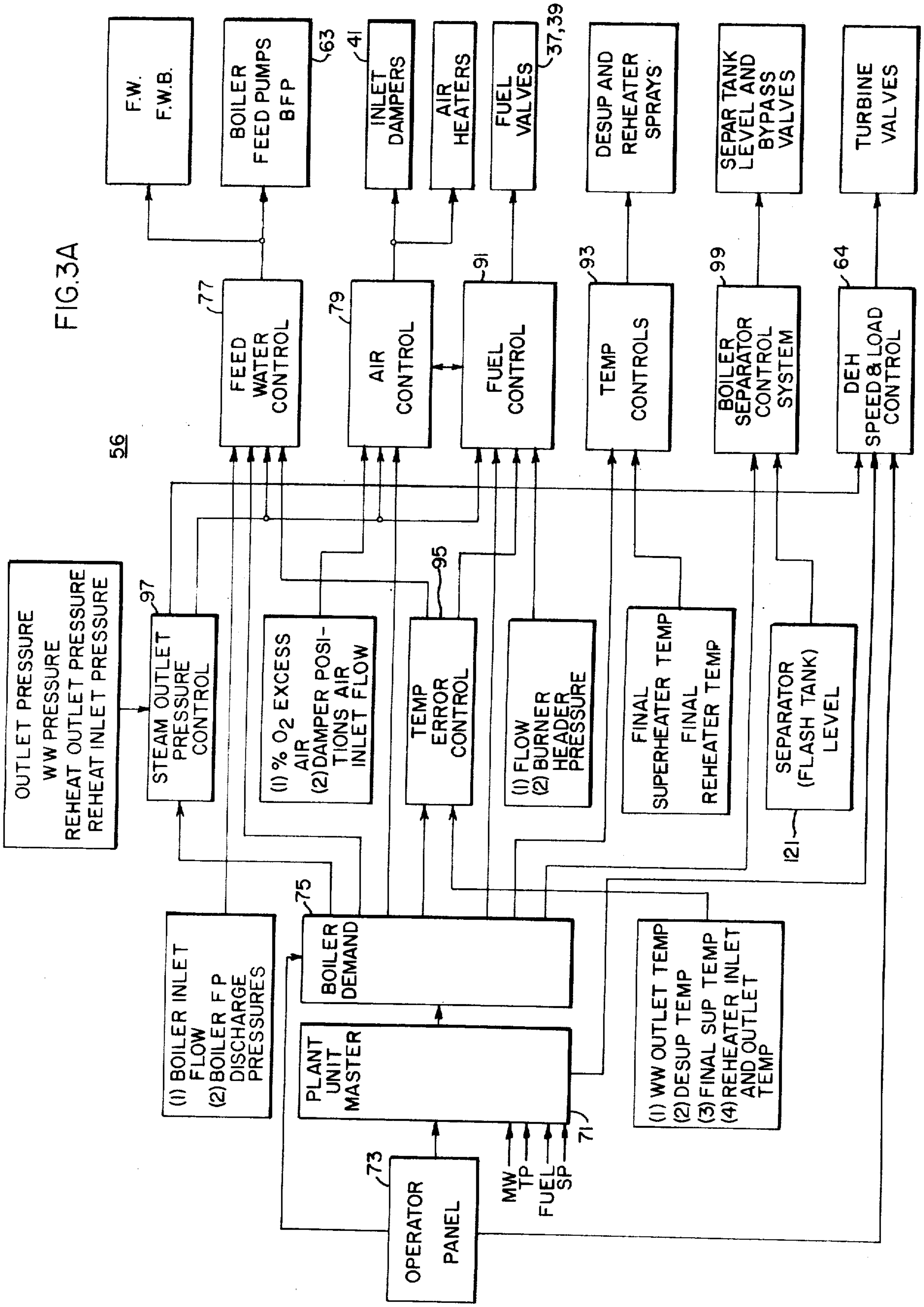
FIG. 3A shows a schematic block diagram of a plant unit master control system for the electric power plant shown in FIG. 1A.

In FIG. 3B, there is shown the preferred arrangemente 64 of control loops employed in the control system 11 to provide automatic and manual turbine operation. To provide for power generation continuity and security, a manual backup control 81 is shown for implementing operator control actions during time periods when the automatic control is shut down. Relay contacts effect automatic or manual control operation as illustrated. Bumpless transfer is preferably provided between the manual and automatic operating modes, and for this purpose a manual tracker 83 is employed for the purpose of updating the automatic control on the status of the manual control 81 during manual control operation and the manual control 81 is updated on the status of the automatic control during automatic control operation as indicated by the reference character 85.

The control loop arrangement 62 is schematically represented by functional blocks, and varying structure can be employed to produce the block functions. In addition, various block functions can be omitted, modified or added in the control loop arrangement 62 consistently with application of the present invention. It is further noted that the arrangement 62 functions within overriding restrictions imposed by elements of an overall turbine and plant protection system (not specifically indicated in FIG. 3B).

During startup, an automatic speed control loop 66 in the control loop arrangement 62 operates the turbine inlet valves to place the turbine 10 under wide range speed control and bring it to synchronous speed for automatic or operator controlled synchronization. After synchronization, an automatic load control loop 68 operates the turbine inlet valves to load the turbine 10. The speed and load control loops 66 and 68 function through the previously noted EH valve position control loops 62.

The turbine part of the controller 56 of FIG. 1A is included in the control loops 66 and 68. Speed and load demands are generated by a block 70 for the speed and load control loops 66 and 68 under varying operating conditions in the integrated or non-integrated coordinator modes or non-coordinator mode in response to a remote automatic load dispatch input, a synchronization speed requirement, a load or speed input generated by the turbine operator or other predetermined controlling inputs. In the integrated mode, the plant unit master 71 functions as the demand 70. A reference generator block 72 responds to the speed or load demand to generate a speed or load reference during turbine startup and loan operation preferably so that speed and loading change rates are limited to avoid excessive thermal stress on the turbine parts.

An automatic turbine startup control can be included as part of the demand and reference blocks 68 and 70 and when so included it causes the turbine inlet steam flow to change to meet speed and/or load change requirements with rotor stress control. In that manner, turbine life can be strategically extended.

The speed control loop 66 preferably functions as a feedback type loop, and the speed reference is accordingly compared to a representation of the turbine speed derived from the speed detector 60. A speed control 74 responds to the resultant speed error to generate a steam flow demand from which a setpoint is developed for use in developing valve position demands for the EH valve position control loops 62 during speed control operation.

The load control loop 68 preferably includes a frequency participation control subloop, a megawatt control subloop and an impulse pressure control subloop which are all cascaded together to develop a steam flow demand from which a setpoint is derived for the EH valve position control loops 62 during load control operation. The various subloops are preferably designed to stabilize interactions among the major turbine-generator variables, i.e. impulse pressure, megawatts, speed and valve position. Preferably, the individual load control subloops are arranged so that they can be bumplessly switched into and out of operation in the load control loop 68.

The load reference and the speed detector output are compared by a frequency participation control 76, and preferably it includes a proportional controller which operates on the comparison result to produce an output which is summed with the load reference. A frequency compensated load reference is accordingly generated to produce a megawatt demand.

A megawatt control 78 responds to the megawatt demand and a megawatt signal from the detector 18 to generate an impulse pressure demand. In the megawatt control subloop, the megawatt error is determined from the megawatt feedback signal and the megawatt demand, and it is operated upon by a proportional plus integral controller which produces a megawatt trim signal for multiplication against the megawatt demand.

In turn, an impulse pressure control 80 responds to an impulse pressure signal from the detector 38 and the impulse pressure demand from the megawatt control to generate a steam flow demand from which the valve position demands are generated for forward application to the EH valve position control loops 62. Preferably, the impulse pressure control subloop is the feedback type with the impulse pressure error being applied to a proportional plus integral controller which generates the steam flow demand.

Generally, the application of feedforward and feedback principles in the control loops and the types of control transfer functions employed in the loops can vary from application to application. More detail on the described control loops is presented in the cross-referenced copending application Ser. No. 247,877.

Speed loop or load loop steam flow demand is applied to a position demand generator 82 which generates feedforward valve position demands for application to the EH valve position controls 52, 54 in the EH valve position control loops 62. Generally, the position demand generator 82 employs an appropriate characterization to generate throttle and governor valve position demands as required for implementing the existing control mode as turbine speed and load requirements are satisfied. Thus, up to 80percent synchronous speed, the governor valves are held wide open as the throttle valves are positioned to achieve speed control. After transfer, the throttle valves are held wide open and the governor valves are positioned either in single valve operation or sequential valve operation to achieve speed and/or load control. The position demand generator 82 can also include a valve management function as set forth more fully in the cross-referenced copending patent application Ser. No. 306,789.

Control System

Figure 4:
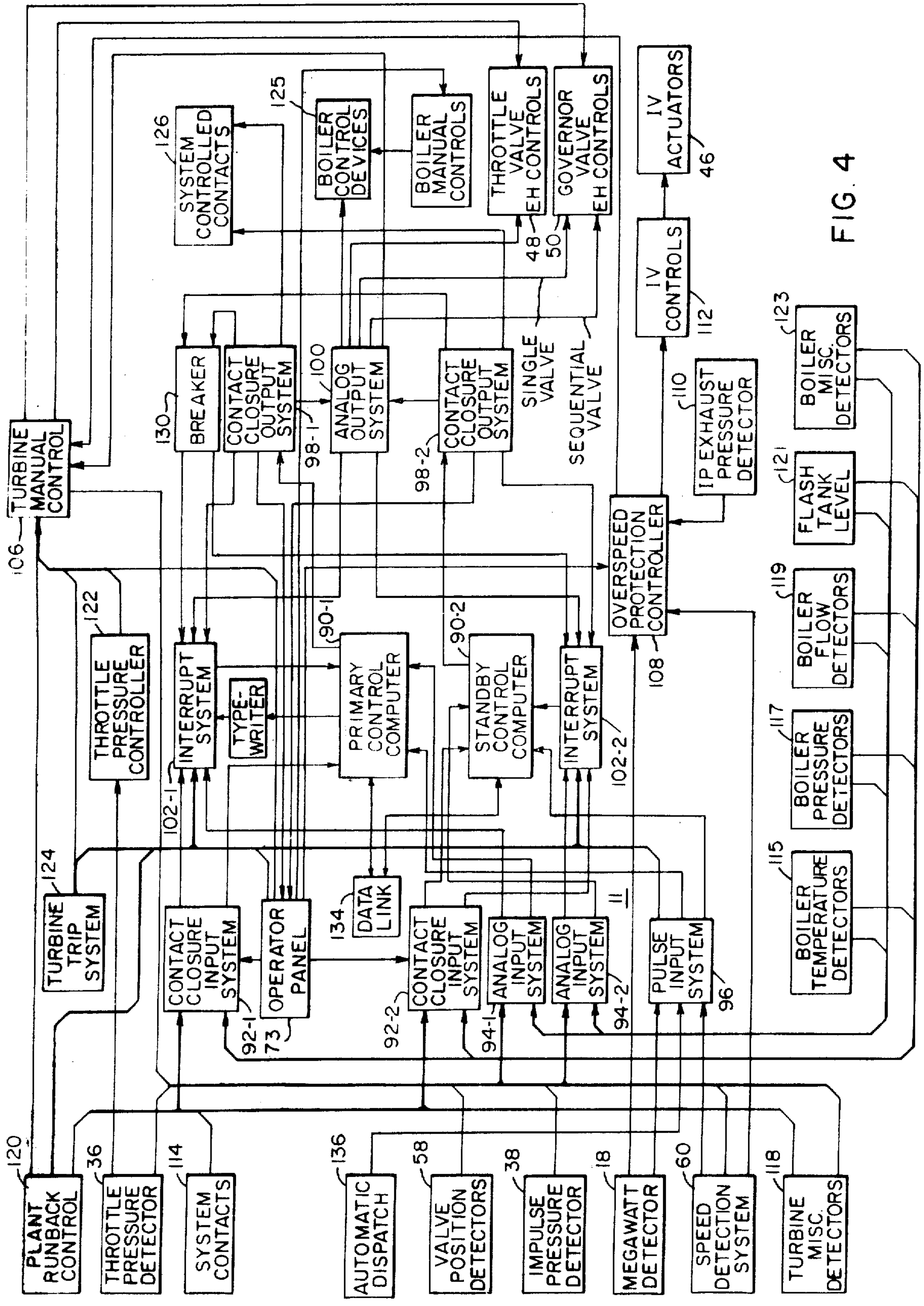
FIG. 4 shows a schematic diagram of apparatus employed in a control system for the steam turbine and the once-through boiler of the electric power plant of FIG. 1A.

The control system 11 includes multiple and preferably two programmed digital control computers 90-1 and 90-2 and associated input/output equipment as shown in the block diagram of FIG. 4 where each individual block generally corresponds to a particular structural unit of the control system 11. The computer 90-1 is designated as the primary on-line control computer and the computer 90-2 is a standby and preferably substantially redundant by programmed computer which provides fully automatic backup operation of the turbine 10 and the boiler 22 under all plant operating conditions. As needed, the computers 90-1 and 90-2 may have their roles reversed during plant operation, i.e. the computer 90-1 may be the standby computer. As shown in FIG. 5B and briefly considered subsequently herein, a plant monitoring computer can also provide some control functions within the control system 11. The fact that the boiler and turbine controls are integrated in a single computer provides the advantage that redundant computer backup control for two major pieces of apparatus is possible with two computers as opposed to four computers as would be the case where separate computers are dedicated to separate major pieces of apparatus. Further, it is possible in this manner to achieve some economy in background programming commonly used for both controls.

In relating FIGS. 3A and 3B with FIG. 4, it is noted that particular functional blocks of FIGS. 3A and 3B may be embraced by one or more structural blocks of FIG. 4. The computers 90-1 and 90-2 in this case are P2000 computers sold by Westinghouse Electric Corporation and designed for real time process control applications. The P2000 operates with a 16-bit word length, 2's complement, and single address in a parallel mode. A 3 microsecond memory cycle time is employed in the P2000 computer and all basic control functions can be performed with a 65K core memory. Expansion can be made to a 65K core memory to handle various options includable in particular control systems by using mass memory storage devices.

Generally, input/output interface equipment is preferably duplicated for the two computers 90-1 and 90-2. Thus, a conventional contact closure input system 92-1 or 92-2 and an analog input system 94-1 or 94-2 are preferably coupled to each computer 90-1 or 90-2 to interface system analog and contact signals with the computer at its input. A dual channel pulse input system 96 similarly interfaces pulse type system signals with each computer at its input. Computer output signals are preferably interfaced with external controlled devices through respective suitable contact closure output systems 98-1 and 98-2 and a suitable analog output system 100.

A conventional interrupt system 102-1 or 102-2 is employed to signal each computer 90-1 or 90-2 when a computer input is to be executed or when a computer output has been executed. The computer 90-1 or 90-2 operates immediately to detect the identity of the interrupt and to execute or to schedule execution of the response required for the interrupt.

The operator panel 73 provides for operator control, monitoring, testing and maintenance of the turbine-generator system and the boiler 22. Panel signals are applied to the computer 90-1 or 90-2 through the contact closure input system 92-1 or 92-2 and computer display outputs are applied to the panel 73 through the contact closure output system 98-1 or 98-2. During manual turbine control, panel signals are applied to a manual backup control 106 which is like the manual control 65 of FIG. 3B but is specifically arranged for use with both digital computers 90-1 and 90-2.

An overspeed protection controller 108 provides protection for the turbine 10 by closing the governor valves and the interceptor valves under partial or full load loss and overspeed conditions, and the panel 73 is tied to the overspeed protection controller 108 to provide an operating setpoint therefor. The power or megawatt detector 18, the speed detector 60 and an exhaust pressure detector 110 associated with the IP turbine section generate signals which are applied to the controller 108 in providing overspeed protection. More detail on a suitable overspeed protection scheme is set forth in U.S. Pat. No. 3,643,437, issued to M. Birnbaum et al.

Generally, process sensors are not duplicated and instead the sensor outputs are applied to the input interface equipment of the computer in control. Input signals are applied to the computers 90-1 and 90-2 from various relay contacts 114 in the turbine-generator system and the boiler 22 through the contact closure input systems 92. In addition, signals from the electric power, steam pressure and speed detectors 18, 36, 38 and 60 and steam valve position detectors 50 and other miscellaneous turbine-generator detectors 118 are interfaced with the computer 90-1 or 90-2. The detectors 118 for example can include impulse chamber and other temperature detectors, vibration sensors, differential expansion sensors, lubricant and coolant pressure sensors, and current and voltage sensors. Boiler process detectors include waterwall outlet desuperheater, final superheater, reheater inlet and outlet and other temperature detectors 115, waterwall and reheat and BFP discharge and other pressure detectors 117, boiler inlet and other flow detectors 119, flash tank level detector 121 and other miscellaneous boiler sensors 123.

Generally, the turbine and boiler control loops described in connection with FIGS. 3A and 3B are embodied in FIG. 4 by incorporation of the computer 90-1 or 90-2 as a control element in those loops. The manual backup control 106 and its control loop are interfaced with and are external to the computers 90-1 and 90-2.

Certain other control loops function principally as part of a turbine protection system externally of the computer 90-1 or 90-2 or both externally and internally of the computer 90-1 or 90-2. Thus, the overspeed protection controller 108 functions in a loop external to the computer 90-1 or 90-2 and a plant runback control 120 functions in a control loop through the computer 90-1 or 90-2 as well as a control loop external to the computer 90-1 or 90-2 through the manual control 106. A throttle pressure control 122 functions through the manual control 106 in a control loop outside the computer 90-1 or 90-2, and throttle pressure is also applied to the computer 90-1 or 90-2 for monitoring and control purposes as described in connection with FIG. 3A. A turbine trip system 124 causes the manual control and computer control outputs to reflect a trip action initiated by independent mechanical or other trips in the overall turbine protection system.

Contact closure outputs from the computer 90-1 or 90-2 operate various turbine and boiler system contacts 126, various displays, lights and other devices associated with the operator panel 73. Further, in a plant synchronizing system, a breaker 130 is operated by the computer 90-1 or 90-2 through computer output contacts. If desired, synchronization can be performed automatically during startup with the use of an external synchronizer it can be accurately performed manually with the use of the accurate digital speed control loop which operates through the computer 90-1 or 90-2, or it can be performed by use of an analog/digital hybrid synchronization system which employs a digital computer in the manner set forth in a copending application Ser. No. 276,508, entitled "System And Method Employing A Digital Computer For Automatically Synchronizing A Gas Turbine Or Other Electric Power Plant Generator With A Power System" filed by J.

Reuther on July 31, 1972 as a continuation of an earlier filed patent application and assigned to the present assignee. In the present case, synchronization is preferably performed under operator control.

The analog output system 100 accepts outputs from one of the two computers and employs a conventional resistor network to produce output valve position signals for the turbine throttle and governor valve controls during automatic control. Further, the automatic valve position signals are applied to the manual control 106 for bumpless automatic/manual transfer purposes. In manual turbine operation, the manual control 106 generates the position signals for application to the throttle and governor valve controls and for application to the computer 90 for computer tracking needed for bumpless manual/automatic transfer. The analog output system 100 further applies output signals to various boiler control devices 125 in boiler automatic operation. These devices include all those previously described devices which are used for controlling boiler fuel, air and water flows and for other purposes. A set of boiler manual controls 127 operates off the operator panel 73 to provide manual boiler operations for those loops where automatic boiler operation has been rejected by the operator or by the control system.

An automatic dispatch computer or other controller 136 is coupled to the computers 90-1 and 90-2 through the pulse input system 96 for system load scheduling and dispatch operations. A data link 134 in this case provides a tie between the digital computers 90-1 and 90-2 for coordination of the two computers to achieve safe and reliable plant operation under varying contingency conditions.

Program System For Control Computers

Figure 5A:
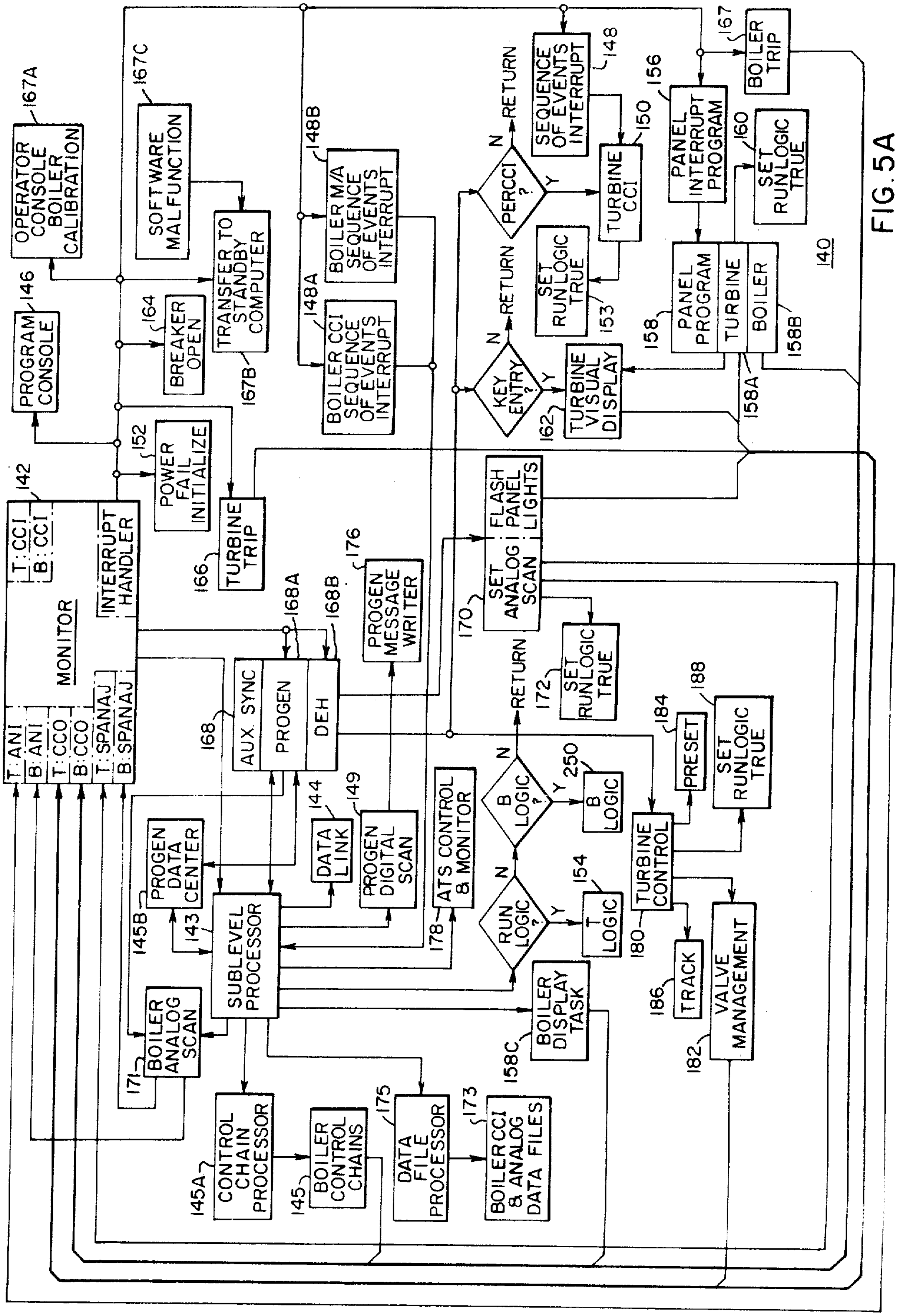
FIG. 5A shows a block diagram of the organization of a program system included in each of two computers employed in the control system of FIG. 4.
Figure 5B:
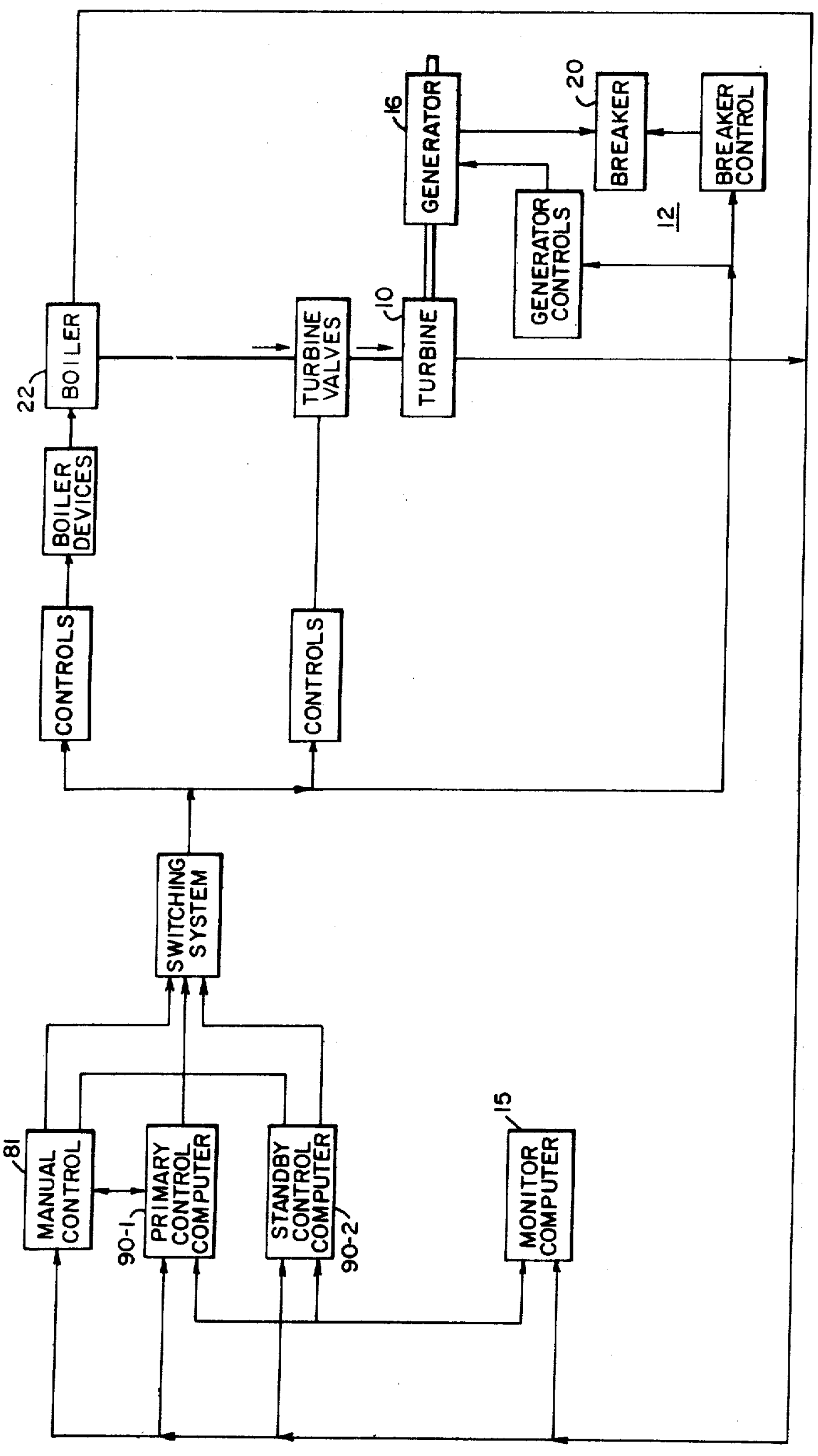
FIG. 5B shows a schematic apparatus block diagram of the electric power plant of FIG. 1A with the control system shown from the standpoint of the organization of computers in the system.
Figure 6:
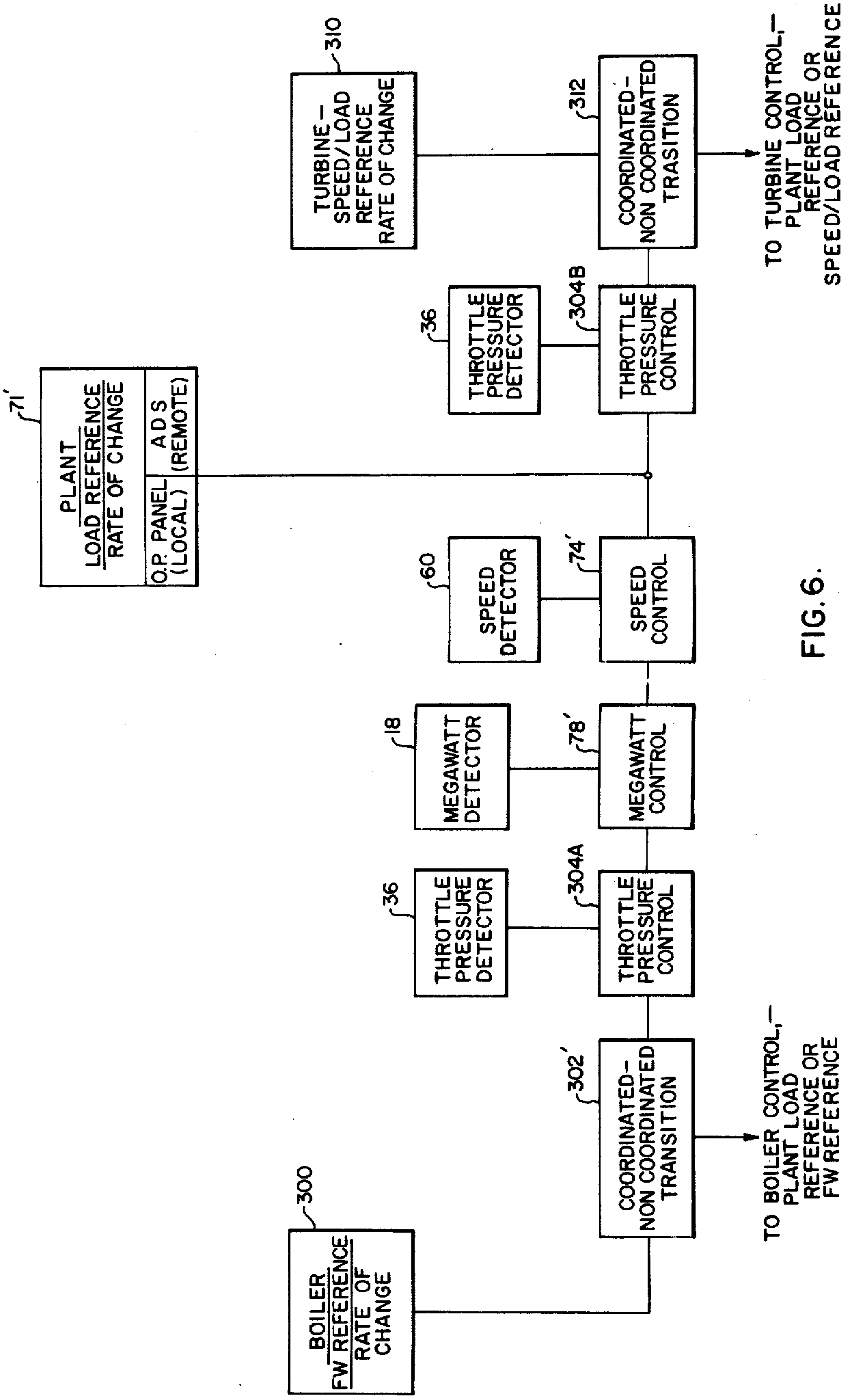
FIG. 6 shows a schematic block diagram of the plant unit master for applying a plant reference signal in parallel to control the electric power plant as shown in FIG. 1A.

A computer program system 140 is preferably organized as shown in FIG. 5A to operate the control system 11 as a sampled data system in providing turbine and control variable monitoring and continuous turbine, boiler and plant control with stability, accuracy and substantially optimum response. Substantially like programming corresponding to the program system is loaded in both computers 90-1 and 90-2. However, some minor programming differences do exist. The program system 140 will be described herein only to the extent necessary to develop an understanding of the manner in which the present invention is applied. As shown in FIG. 5B, it is also noted that the plant 12 is provided with a plant monitoring computer 15 which principally functions as a plant data logger and a plant performance calculator. In addition, certain plant sequencing control functions may be performed in the computer 15. For example, the computer 15 may sequence the particular burners and the particular burner levels which are to be used to execute fuel flow demand from the control computer 90-1 or 90-2. However, the sequencing functions of the computer 15 generally are not essential to an understanding of the present invention and they are therefore not considered in detail herein.

An executive or monitor program 142, an auxiliary synchronizer 168 including a PROGEN synchronizer section 168A and a DEH synchronizer section 168B, and a sublevel processor 143 provide scheduling control over the running of boiler control chains and various programs in the computer 90-1 or 90-2 as well as control over the flow of computer inputs and outputs through the previously described input/output systems. Generally, the executive priority system has 16 task levels and most of the DEH programs are assigned to 8 task levels outside the PROGEN sublevel processor 143. The lowest task level is made available for the programmer's console and the remaining 7 task levels are assigned to PROGEN. Thus, boiler control chains and some DEH and other programs are assigned as sublevel tasks on the various PROGEN task levels in the sublevel processor 143. Generally, bids are processed to run the bidding task level with the highest priority. Interrupts may bid programs, and all interrupts are processed with a priority higher than any task or subtask level.

Generally, the program system 140 is a combination of turbine control programs and boiler control chains 145 along with the support programming needed to execute the control programs and the chains 145 with an interface to the power plant in real time. The boiler control chains 145 are prepared with the use of an automatic process programming and structuring system known as PROGEN and disclosed in the referenced patent application Ser. No. 250,826. The PROGEN executed DEH or turbine programs and the boiler control chains 145 are interfaced with the support programs such as the sublevel processor 143, the auxiliary synchronizer 168, a control chain processor 145A and the executive monitor 142 generally in the manner described in Ser. No. 250,826. A PROGEN data center 145B provides PROGEN initialization and other data. The turbine control programs are like those disclosed in the referenced patent applications Ser. No. 247,877 and Ser. No. 306,752, and those turbine or DEH programs which bypass the sublevel processor 143 are interfaced with the auxiliary synchronizer 168 as described in the same application.

Once the boiler control chains 145 are written, they are processed off-line by a control chain generator (not indicated in FIG. 5B) and the output from the latter is entered into the computer with use of a file loader program (not indicated). Chains then are automatically stored in the computer and linked to the process through the I/O equipment and to other programmed chains and program elements as required to execute the desired real time chain performance. Logic related to the selection of a chain for execution or the process triggering of a selected chain generally is entered into the computer 90-1 or 90-2 as a separate chain. Thus, if a particular boiler control mode requires the execution of a certain chain, the chain is automatically executed when that mode is selected.

A data link program 144 is bid periodically or on demand to provide for intercomputer data flow which updates the status of the standby computer relative to the controlling computer in connection with computer switchover in the event of a contingency or operator selection. A programmer's console program 146 is bid on demand by interrupt and it enables program system changes to be made.

When a turbine system contact changes state, an interrupt causes a sequence of events interrupt program 148 to place a bid for a scan of all turbine system contacts by a program 150. A periodic bid can also be placed for running the turbine contact closure input program 150 through a block 151. Boiler contacts are similarly scanned by a PROGEN digital scan 149 in response to a boiler contact change detected with a Manual/Auto Station sequence of events interrupt 148A or a boiler plant CCI sequence of events interrupt 148B. A power fail initialize 152 also can bid the turbine contact closure input program 150 to run as part of the computer initialization procedure during computer starting or restarting. The program 152 also initializes turbine contact outputs through the executive 142. In some instances, changes in turbine contact inputs will cause a bid 153 to be placed for a turbine logic task program 154 to be executed so as to achieve programmed responses to certain turbine contact input changes. Periodic scanning of boiler contacts by the block 149 is initiated through the sublevel processor 143.

When an operator panel signal is generated, external circuitry decodes the panel input and an interrupt is generated to cause a panel interrupt program 156 to place a bid for the execution of a panel program 158 which includes turbine and boiler portions 158A and 158B and which provides a response to the panel request. The turbine panel program 158A can itself carry out the necessary response or it can place a bid 160 for the turbine logic task program 154 to perform the response or it can bid a turbine visual display program 162 to carry out the response. In turn, the turbine visual display program 162 operates contact closure outputs to produce the responsive panel display. Similarly, the boiler panel program 158B may itself provide a response or it may place a bid for a task to be performed, such as the execution of a boiler visual display task 158C which operates CCO's.

Generally, the turbine visual display program 162 causes numerical data to be displayed in panel windows in accordance with operator requests. When the operator requests a new display quantity, the visual display program 162 is initially bid by the panel program 158. Apart from a new display request, the turbine visual display program 162 is bid periodically to display the existing list of quantities requested for display. The boiler display task 158C similarly is organized to provide a boiler data display for the plant operator through output devices.

The turbine pushbuttons and keys on the operator panel 104 are classifiable in one of several functional groups. Some turbine pushbuttons are classified as control system switching since they provide for switching in or out certain control functions. Another group of turbine pushbuttons provide for operating mode selection. A third group of pushbuttons provide for automatic turbine startup and a fourth group provide for manual tubine operation. Another group of turbine pushbuttons are related to valve status/testing/limiting, while a sixth group provide for visual display and change of DEH system parameters.

Boiler and plant panel pushbuttons include a large number which serve as manual/automatic selectors for various controlled boiler drives, valves and other devices. Other boiler and plant pushbottons relate to functions including operating mode selection and visual display. Certain pushbuttons relate to keyboard activity, i.e. of the entry of numerical data into the computer 90-1 or 90-2.

A breaker open interrupt program 164 causes the computer 90-1 or 90-2 to generate a close governor valve bias signal when load is dropped. Similarly, when the trip system 124 trips the turbine 10 or when the boiler 22 is tripped, a trip interrupt program 166 causes close throttle and governor valve bias signals to be generated by the computer 90-1 or 90-2. On a boiler trip, a program 167 configures the control computers for a plant shutdown. Boiler trips can be produced for example by the monitor computer 15 on the basis of calculated low pressure or improper flow or other parameters or on the basis of hardware detected contingencies such as throttle overpressure or waterwall overpressure or on the basis of improper water conductivity detected in the controlling computer. After the governor valves have been closed in response to a breaker open interrupt, the turbine system reverts to speed control and the governor valves are positioned to maintain synchronous speed.

Boiler calibration is provided as an operator console function as indicated by block 167A. A computer switchover is triggered by block 167B in response to a hardware interrupt condition or in response to a software malfunction 167C.

Periodic programs are scheduled by the auxiliary synchronizer program 168. An external clock (not shown) functions as the system timing source. A task 170 which provides turbine analog scan is directly bid every half second to select turbine analog inputs for updating through an executive analog input handler. A boiler analog scan 171 is similarly run through the sublevel processor 143 to update boiler analog inputs in PROGEN files 173 under the control of a PROGEN data file processor 175. After scanning, the analog scan program 170 or 171 converts the inputs to engineering units, performs limit checks and makes certain logical decisions. The turbine logic task 154 may be bid by block 172 as a result of a turbine analog scan program run. Similarly, a boiler control chain may be bid as a result of the updating of a boiler analog data file.

The task 170 also provides a turbine flash panel light function to flash predetermined turbine panel lights through the executive contact closure output handler under certain conditions. In the present embodiment, a total of nine turbine conditions are continually monitored for flashing.

The turbine logic program 154 is run periodically to perform various turbine logic tasks if it has been bid. A PROGEN message writer program 176 is run off the sublevel processor every 5 seconds to provide a printout of significant automatic turbine startup events and other preselected messages.

A boiler logic program 250 is run each time a run logic flag has been set. If the resultant bid is for a boiler logic function, the turbine logic is bypassed and only the boiler logic is run. On the other hand, a turbine logic function bid does result in the execution of the boiler logic.

The turbine software control functions are principally embodied in an automatic turbine startup (ATS) control and monitoring program 178 periodically run off the sublevel processor 143 and a turbine control program 180 periodically run off the DEH auxiliary synchronizer 168B, with certain supportive program functions being performed by the turbine logic task 154 or certain subroutines. To provide rotor stress control on turbine acceleration or turbine loading rate in the startup speed control loop 66 or the load control loop 68, rotor stress is calculated by the ATS program 178 on the basis of detected turbine impulse chamber temperature and other parameters.

The ATS program 178 also supervises turning gear operation, eccentricity, vibration, turbine metal and bearing temperatures, exciter and generator parameters, gland seal and turbine exhaust conditions, condenser vacuum, drain valve operation, anticipated steam chest wall temperature, outer cylinder flange-base differential, and end differential expansion. Appropriate control actions are initiated under programmed conditions detected by the functioning of the monitor system.

Among other functions, the ATS program 178 also sequences the turbine through the various stages of startup operation from turning gear to synchronization. More detail on a program like the ATS program 178 is disclosed in another copending application Ser. No. 247,598 entitled "System And Method For Operating A Steam Turbine With Digital Computer Control Having Automatic Startup Sequential Programming", filed by J. Tanco on Apr. 26, 1972 and assigned to the present assignee.

In the turbine control program 180, program functions generally are directed to (1) computing throttle and governor valve positions to satisfy speed and/or load demand during operator or remote automatic operation and (2) tracking turbine valve position during manual operation. Generally, the control program 180 is organized as a series of relatively short subprograms which are sequentially executed.

In performing turbine control, speed data selection from multiple independent sources is utilized for operating reliability, and operator entered program limits are placed on high and low load, valve position and throttle pressure. Generally, the turbine control program 180 executes operator or automatically initiated transfers bumplessly between manual and automatic modes and bumplessly between one automatic mode and another automatic mode. In the execution of control and monitor functions, the control program 180 and the ATS program 178 are supplied as required with appropriate representations of data derived from input detectors and system contacts described in connection with FIG. 4. Generally, predetermined turbine valve tests can be performed on-line compatibly with control of the turbine operation through the control programming.

The turbine control program 180 logically determines turbine operating mode by a select operating mode function which operates in response to logic states detected by the logic program 154 from panel and contact closure inputs. For each mode, appropriate values for demand and rate of change of demand are defined for use in control program execution of speed and/or load control.

The following turbine speed control modes are available when the breaker is open in the hierarchical order listed: (1) Automatic Synchronizer in which pulse type contact inputs provide incremental adjustment of the turbine speed reference and demand; (2) Automatic Turbine Startup which automatically generates the turbine speed demand and rate; (3) Operator Automatic in which the operator generates the speed demand and rate; (4) Maintenance Test in which the operator enters speed demand and rate while the control system is being operated as a simulator/trainer; (5) Manual Tracking in which the speed demand and rate are internally computed to track the manual control preparatory to bumpless transfer from manual to automatic operation.

The following turbine load control modes are available when the breaker is closed in the hierarchical order listed: (1) Throttle Pressure Limiting in which the turbine load reference is run back at a predetermined rate to a preset minimum as long as the limiting condition exists; (2) Runback in which the load reference is run back at a predetermined rate as long as predefined contingency conditions exist; (3) Automatic Dispatch System in which pulse type contact inputs provide for adjusting the turbine load reference and demand; (4) Automatic Turbine Loading (if included in system) in which the turbine load demand and rate are automatically generated; (5) Operator Automatic in which the operator generates load demand and rate; (6) Maintenance Test in which the operator enters load demand and rate while the control system is being operated a simulator/trainer; (7) Manual Tracking in which the load demand and rate are internally computed to track the manual control preparatory to bumpless transfer to automatic control.

In executing turbine control within the control loops described in connection with FIG. 3B, the control program 180 includes a speed/load reference function. Once the turbine operating mode is defined, the speed/load reference function generates the reference which is used by the applicable control functions in generating valve position demand.

The turbine speed or load reference is generated at a controlled or selected rate to meet the defined demand. Generation of the reference at a controlled rate until it reaches the demand is especially significant in the automatic modes of operation. In modes such as the Automatic Synchronizer or Automatic Dispatch System, the reference is advanced in pulses which are carried out in single steps and the speed/load reference function is essentially inactive in these modes. Generally, the speed/load reference function is responsive to GO and HOLD logic and in the GO condition the reference is run up or down at the program defined rate until it equals the demand or until a limit condition or synchronizer or dispatch requirement is met.

A turbine speed control function provides for operating the throttle and governor valves to drive the turbine 10 to the speed corresponding to the reference with substantially optimum dynamic and steady-state response. The speed error is applied to either a software proportional-plus-reset throttle valve controller or a software proportional-plus-reset governor valve controller.

Similarly, a turbine load control function provides for positioning the governor valves so as to satisfy the existing load reference with substantially optimum dynamic and steady-state response. The load reference value computed by the operating mode selection function is compensated for frequency participation by a proportional feedback trim factor and for megawatt error by a second feedback trim factor. A software proportional-plus-reset controller is employed in the megawatt feedback trim loop to reduce megawatt error to zero.

If the speed and megawatt loops are in service, the frequency and megawatt corrected load reference operates as a setpoint for the impulse pressure control or as a flow demand for a valve management subroutine 182 (FIG. 5A) according to whether the impulse pressure control is in or out of service. In the impulse pressure control, a software proportional-plus-reset controller is employed to drive the impulse pressure error to zero. The output of the impulse pressure controller or the output of the speed and megawatt corrected load reference functions as a governor valve setpoint which is converted into a percent flow demand prior to application to the valve mangagement subroutine 182.

The turbine control program 180 further includes a throttle valve control function and a governor valve control function. During automatic control, the outputs from the throttle valve control function are position demands for the throttle valves, and during manual control the throttle valve control outputs are tracked to the like outputs from the manual control 106. Generally, the position demands hold the throttle valves closed during a turbine trip, provide for throttle valve position control during startup and during transfer to governor valve control, and drive and hold the throttle valves wide open during and after the completion of the throttle/governor valve transfer.

The governor valve control function generally operates in a manner similar to that described for the throttle valve control function during automatic and manual operations of the control system 11. If the valve management subroutine 182 is employed, the governor valve control function outputs data applied to it by the valve management subroutine 182.

If the valve management subroutine 182 is not employed, the governor valve control function employs a nonlinear characterization function to compensate for the nonlinear flow versus lift characteristics of the governor valves. The output from the nonlinear characterization function represents governor valve position demand which is based on the input flow demand. A valve position limit entered by the operator may place a restriction on the governor valve position demand prior to output from the computer 90.

Generally, the governor valve control function provides for holding the governor valves closed during a turbine trip, holding the governor valves wide open during startup and under throttle valve control, driving the governor valves closed during transfer from throttle to governor valve operation during startup, reopening the governor valves under position control after brief closure during throttle/governor valve transfer and thereafter during subsequent startup and load control.

A preset subroutine 184 evaluates an algorithm for a proportional-plus-reset controller as required during execution of the turbine control program 180. In addition, a track subroutine 186 is employed when the control system 11 is in the manual mode of operation. In the operation of the multiple computer system, the track subroutine is operated open loop in the computer on standby so as to provide for turbine tracking in the noncontrolling computer.

Certain logic operations are performed by the turbine logic program 154 in response to a control program bid by block 188. The logic program 154 includes a series of control and other logic duties which are related to various parts of the turbine portion of the program system 140 and it is executed when a bid occurs on demand from the auxiliary synchronizer program 168 in response to a bid from other programs in the system. In the present system, the turbine logic is organized to function with the plant unit master, i.e. the megawatt and impulse pressure controls are preferably forced out of service on coordinated control so that the load control function can be freely coordinated at the plant level.

Generally, the purpose of the turbine logic program 154 is to define the operational status of the turbine portion of the control system 11 from information obtained from the turbine system, the operator and other programs in the program system 140. Logic duties included in the program 154 include the following: flip-flop function; maintenance task; speed channel failure monitor lamps; automatic computer to manual transfer logic; operator automatic logic; GO and HOLD logic; governor control and throttle control logic; turbine latch and breaker logic; megawatt feedback, impulse pressure, and speed feedback logic; and automatic synchronizer and dispatch logic.

During automatic computer control, the turbine valve management subroutine 182 develops the governor valve position demands needed to satisfy turbine steam flow demand and ultimately the speed/load reference and to do so in either the sequential or the single valve mode of governor valve operation or during transfer between these modes. Mode transfer is effected bumplessly with no load change other than any which might be demanded during transfer. Since changes in throttle pressure cause actual steam flow changes at any given turbine inlet valve position, the governor valve position demands may be corrected as a function of throttle pressure variation. In the manual mode, the track subroutine 186 employs the valve management subroutine 182 to provide governor valve position demand calculations for bumpless manual/automatic transfer.

Governor valve position is calculated from a linearizing characterization in the form of a curve of valve position (or lift) versus steam flow. A curve valid for low-load operation is stored for use by the valve management program 182 and the curve employed for control calculations is obtained by correcting the stored curve for changes in load or flow demand and preferably for changes in actual throttle pressure. Another stored curve or flow coefficient versus steam flow demand is used to determine the applicable flow coefficient to be used in correcting the stored low-load position demand curve for load or flow changes. Preferably, the valve position demand curve is also corrected for the number of nozzles downstream from each governor valve.

In the single valve mode, the calculated total governor valve position demand is divided by the total number of governor valves to generate the position demand per valve which is output as a single valve analog voltage (FIG. 4) applied commonly to all governor valves. In the sequential mode, the governor valve sequence is used in determining from the corrected position demand curve which governor valve or group of governor valves is fully open and which governor valve or group of governor valves is to be placed under position control to meet load references changes. Position demands are determined for the individual governor valves, and individual sequential valve analog voltages (FIG. 4) are generated to correspond to the calculated valve position demands. The single valve voltage is held at zero during sequential valve operation and the sequential valve voltage is held at zero during single valve operation.

To transfer from single to sequential valve operation, the net position demand signal applied to each governor valve EH control is held constant as the single valve analog voltage is stepped to zero and the sequential valve analog voltage is stepped to the single valve voltage value. Sequential valve position demands are then computed and the steam flow changes required to reach target steam flows through individual governor valves are determined. Steam flow changes are then implemented iteratively, with the number of iterations determined by dividing the maximum flow change for any one governor valve by a predetermined maximum flow change per iteration. Total steam flow remains substantially constant during transfer since the sum of incremental steam flow changes is zero for any one iteration.

To transfer from sequential to single valve operation, the single valve position demand is determined from steam flow demand. Flow changes required to satisfy the target steam flow are determined for each governor valve, and an iteration procedure like that described for single-to-sequential transfer is employed in incrementing the valve positions to achieve the single valve target position substantially without disturbing total steam flow. If steam flow demand changes during any transfer, the transfer is suspended as the steam flow change is satisfied equally by all valves movable in the direction required to meet the change.

Adaptive or Integrating Controllers

Figure 9:
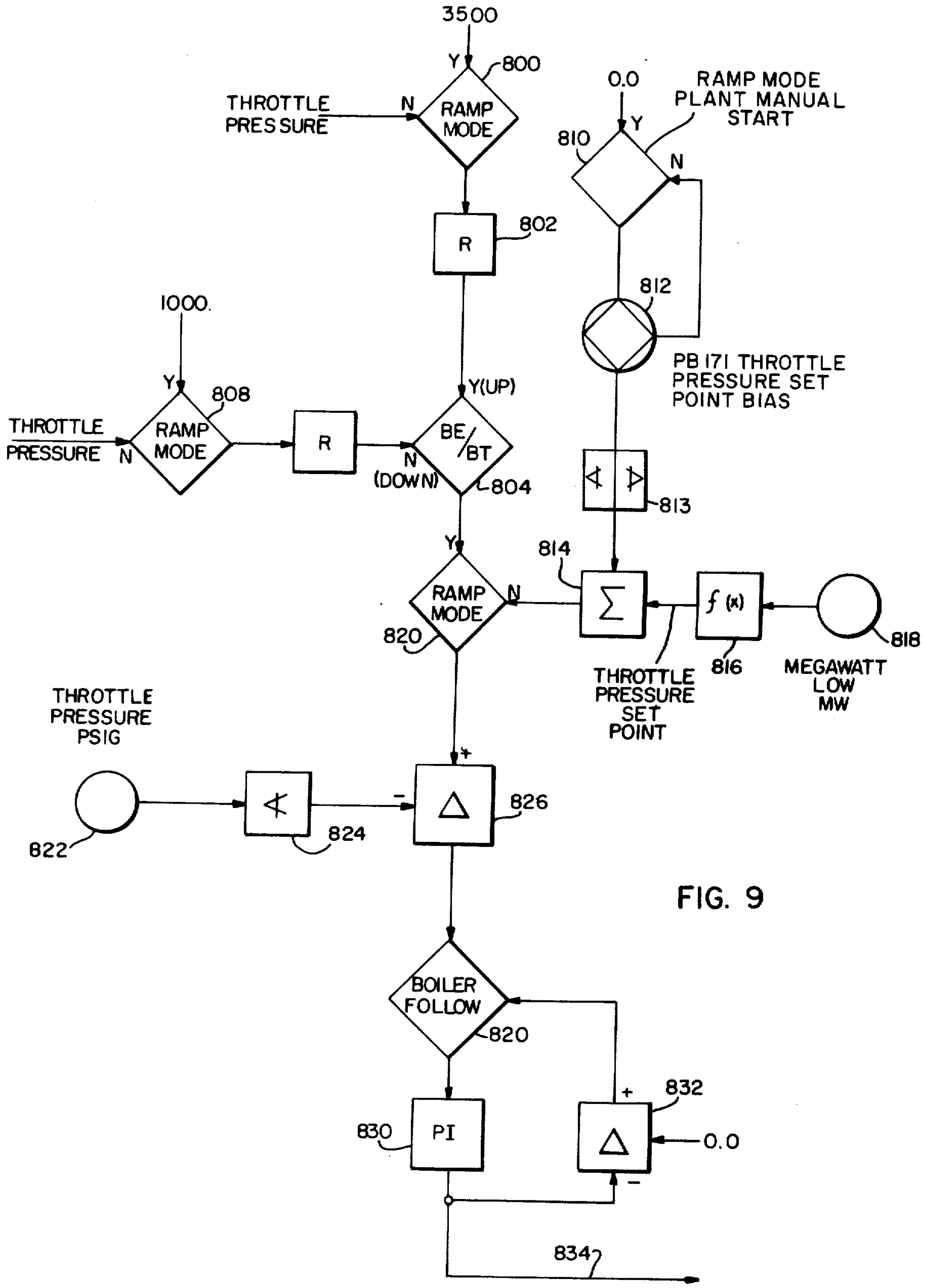
FIG. 9 shows a schematic diagram of the operation of the plant unit master in its Ramp Mode, whereby the feedwater reference entered as shown in FIG. 7, is modified by the generated ramp signal.
Figure 10:
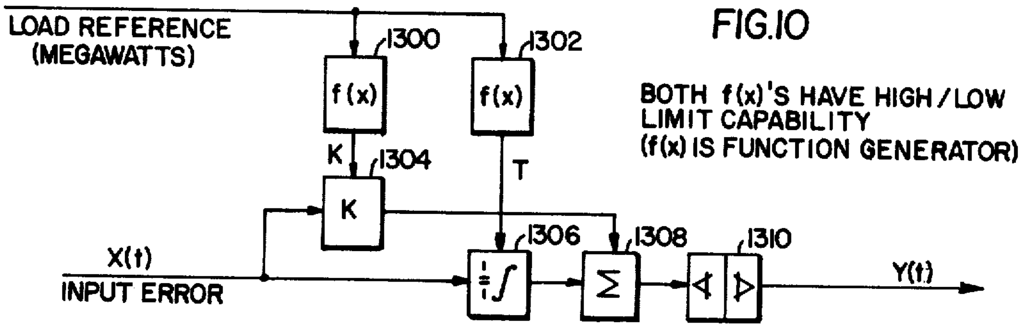
FIG. 10 is a schematic diagram of an integrating controller in accordance with the teachings of this invention.

In FIG. 10, there is shown an integrating controller particularly adapted for use in the control system for an electric power plant. Many boiler control systems have used methods including controllers to linearize its control for improved widerange response. For example, in an electric power plant including a once-through boiler, a measurement of waterwell outlet pressure was taken and used in a control loop to correct and stabilize the feedwater control. The controller so incorporated was characterized by its fixed time constant whereby correction could not be varied as load changed without adding hardware to the system. FIG. 10 shows an integrating controller capable of being implemented by digital techniques whereby there is an ability to vary both the gain and time constants smoothly and bumplessly, whereby the overall control system can be improved. In particular, an input signal taking the form of an error or difference signal between a reference value and a measured value, is applied to a proportional circuit 1304 whose proportional term "K" is variable according to an input derived from a first function generator 1300. Further, the input error signal is applied to an integral circuit 1306, whose time constant "T" is varied in response to an input derived from a second function generator 1302. The output of the proportional circuit 1304 and the integral circuit 1306 are applied to first and second inputs of a summation block 1308. The output of the summation block, in turn, is applied through a high-low limiter 1310 to provide the integrating controller output $y(t)$. As shown in FIG. 10, the output of the function generators 1300 and 1302 vary in response to an indexed quantity applied thereto. In the context of operating within the control system for an electric power plant, the index takes the form of the plant load reference as derived from the plant unit master shown in FIGS. 6 to 9 and more fully described in the above-identified application entitled "Plant Unit Master Control For Fossil Fired Boiler Implemented With A Digital Computer" and specifically incorporated herein by reference. This application describes in detail the operation of the plant unit master in its varying modes; as will be explained, the integrating controllers and the ramp generator may be incorporated into the plant unit master, the boiler control and the turbine control as described in the noted, incorporated application.

In the context of a power plant control system, the function generators 1300 and 1302 may be calibrated according to a curve, for example the curve shown in FIG. 15C. Thus, as the value of the plant load reference in megawatts varies, the output from the function generators 1300 and 1302 imparts corresponding changes to the proportional term K and to the time constant T whereby the outputs of the proportional circuit 1304 and the integrator 1306 vary in a corresponding manner. To gain an appreciation of the effect of varying the proportional term K and the time constant T, illustrative examples of inputs to these circuits and the resulting outputs will be given. If a fixed error is applied to the proportional circuit 1304 and the index varies linearly, the output of the proportional circuit 1304 will be a corresponding ramp signal. Under similar conditions wherein a fixed error signal is applied to the integral circuit 1306 and an increasing ramp is applied to the integral circuit 1306, its output is exponentially increasing but at a decreasing rate.

Alternatively, the integrating controller shown in FIG. 10 may be used in a control loop to control fuel input to the boiler as a function of temperature. In such case, the control process could be calibrated in terms of the index, e.g. megawatts, for a wide range of temperatures. Such a calibrated curve could be incorporated readily into the function generators 1300 and 1302 by computer techniques. Thus, in operation, as the plant load reference index varies, the desired correction in terms of a varying term K and time constant T are imposed upon the integrating controller of FIG. 10, whereby the output provides a corrective signal for the control of fuel input (gas) in an exceptionally accurate manner.

As indicated above, the circuit of FIG. 10 may be readily implemented in computer techniques. For example, the operation of the proportional circuit 1304 and the integrating circuit 1306 may be implemented using a rectangular approximation as follows:

$$Y(t) = Y(t-1) + x(t)\,\frac{[\Delta t]}{T+K}$$

Alternatively, the output $Y(t)$ could be achieved by the following trapezoidal approximation:

$$Y(t) = y(t-1) + Kx(t) + \frac{\Delta t}{2T}[x(t) + x(t-1)]$$

In both of the above expressions, $\Delta t$ is the sampled interval, $T$ is the time constant in seconds, and $K$ is the per-unit proportional gain. In FIG. 10, $T$ and $K$ are calculated using the calibrated curves which may be non-linear as set in the function generators 1300 and 1302. If the index is taken as the plant load reference, T = F(LOAD) and K = F(LOAD). This technique utilizes computer hardware with software techniques to improve the basic control of the electric power plant. Though described for operation in an electric plant, it is understood that such a circuit would have further application. The control system shown in FIG. 10 may be calibrated or tuned without transferring to Manual or requiring plant shutdown; the operator is able to calibrate the curves for the function generators 1300 and 1302 while the plant is operating. Thus, there is shown a control method for adjusting independently both the gain and time constants, which may be implemented with software techniques. The suggested calibration techniques introduce no unwanted, nonlinearities or discontinuities into the control process and variation of the time constants may be effected with a bumpless transfer.

Figure 11:
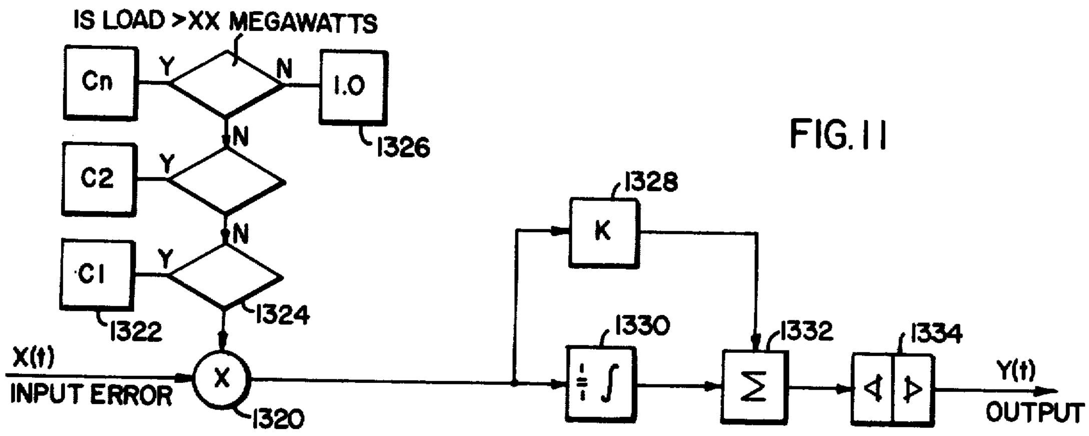
FIGS. 11 and 12 are schematic diagrams of further embodiments of the integrating controller of this invention.

A similar integrating controller is shown in FIG. 11, wherein the input difference or error signal $x(t)$ is applied through a multiplier 1320 to a proportional circuit 1328 and to an integrating circuit 1330. The output of the proportional circuit 1328 and the output of the integrating circuit 1330 are applied, respectively, to first and second inputs of a summing circuit 1332. The output of the summing circuit 1332 is applied through a high-low limiter 1334 to provide the output $Y(t)$. The constants $T$ and $K$ of the integrating controller as shown in FIG. 11 are varied as a function of an index, for example megawatts, in accordance with the variable multiplying factor applied to the multiplier 1320 from a decision block 1324. The decision made by block 1324 is determined with respect to an index, for example, if the load reference exceeds a predetermined quantity in megawatts, a YES decision is made applying the factor derived from block 1332; if NO, the unity factor as supplied from block 1326 is applied to the multiplier 1320. In the example of FIG. 11, if the load reference is below the predetermined level, the input error is multiplied by unity to derive in a normal fashion an integrated output $Y(t)$. However, if the limit is exceeded, the factor $C_1$ is applied to multiply the input error. Illustratively, $C_1$ may assume the value of a fraction or be greater than unity to thereby multiply the input error. It is further understood that a series of like decision blocks may be coupled to the multiplier 1320 whereby differing multiples may be applied to the input error. Thus, the integrating controller of FIG. 11 has the ability to adjust effectively its gain or time constant independently.

Figure 12:
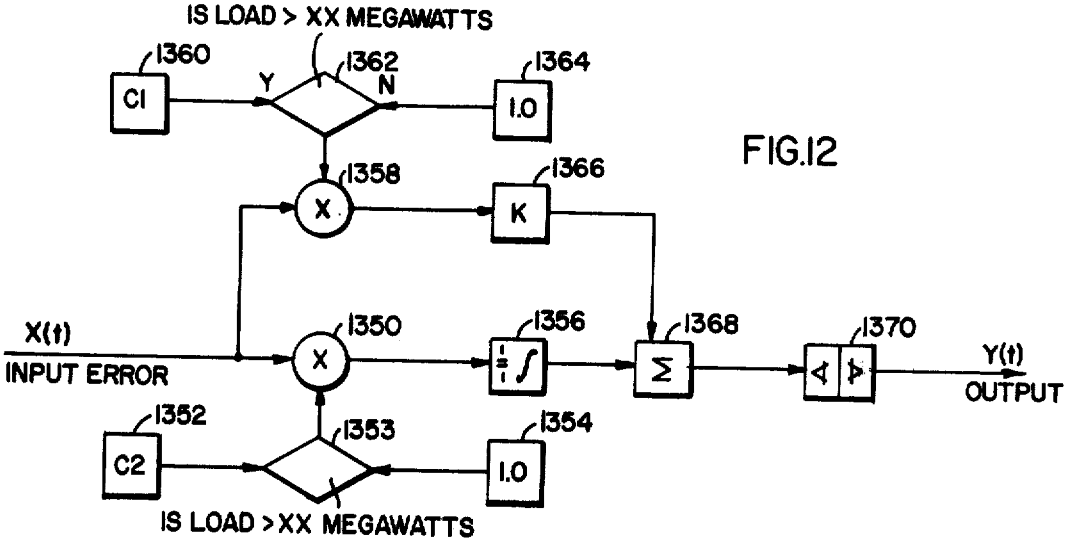

Referring now to FIG. 12, there is shown a further embodiment of this invention, in which the input error or difference signal $x(t)$ is applied through a multiplier 1350 to an integrating circuit 1356 and through a multiplier 1358 to a proportional circuit 1366. The outputs of the proportional circuit 1366 and the integral circuit are applied to first and second inputs, respectively, of a summation circuit 1368. In turn, the output of the summation circuit 1368 is applied through a high-low limiter 1370 to provide the circuit output $y(t)$. In a manner similar to that described above, the gain and time constants may be changed independently through the use of the multipliers 1358 and 1350. In particular, a decision is made by block 1362 whether a particular index is exceeded, e.g. the plant load reference exceeds a predetermined value in megawatts. If YES. a first factor $C_1$ as derived from block 1360 is applied to the multiplier 1358 to multiply thereby the input to the proportional block 1366; if NO, a unity factor 1364 is applied so that in effect, the input error signal $x(t\ )$ is applied directly to the proportional circuit 1366. In a similar manner, a second decision block 1354 effects a decision with respect to whether an index, e.g. plant load reference, is above a predetermined level. If YES, the decision block 1354 applies a second, different factor $C_2$ as derived from block 1352 to multiply in the multiplier 1350 the input error signal $x(t)$ before it is applied to the integrating circuit 1356. If NO, a unity factor as derived from block 1354 is applied to the multiplier 1350 whereby the input error signal is applied, in effect, directly to the integrating circuit 1356. In this manner, the input error signal may be processed with gain and time constants that vary independently.

The adaptive controllers shown and described with respect to FIGS. 10, 11 and 12 are adapted to be used in an electric plant control system and particularly in its boiler control, as will now be explained. In particular, the ramp generator and the integrating controllers are useful, for example, in the following process control systems: (1) in steam temperature control, where temperature error interacts to change the firing rate, where both gain and time constants need to be changed as a function of load; and (2) feedwater control can be stabilized by changing the proportional gain of water well outlet pressure as a function of load. As will be explained, the integrating controllers of FIGS. 10, 11 and 12 are adapted to change their gain and time constants as a function of load, whereby they are particularly adapted to be used in the above-described boiler control systems. There now will be described with respect to FIGS. 14A and 14B, and 15A, 15B and 15C, the feedwater, temperature error, gas recirculation, reheat and superheat portions of the boiler control. Though only a general discussion is provided herein, the specific details of the operation of the entire boiler control including the portions shown in FIGS. 14A and 14B, and 15A, 15B and 15C, is found in the Appendix of the co-pending application entitled "Plant Unit Master Control For Fossil Fired Boiler Implemented With A Digital Computer", incorporated herein specifically be reference.

Figure 13A:
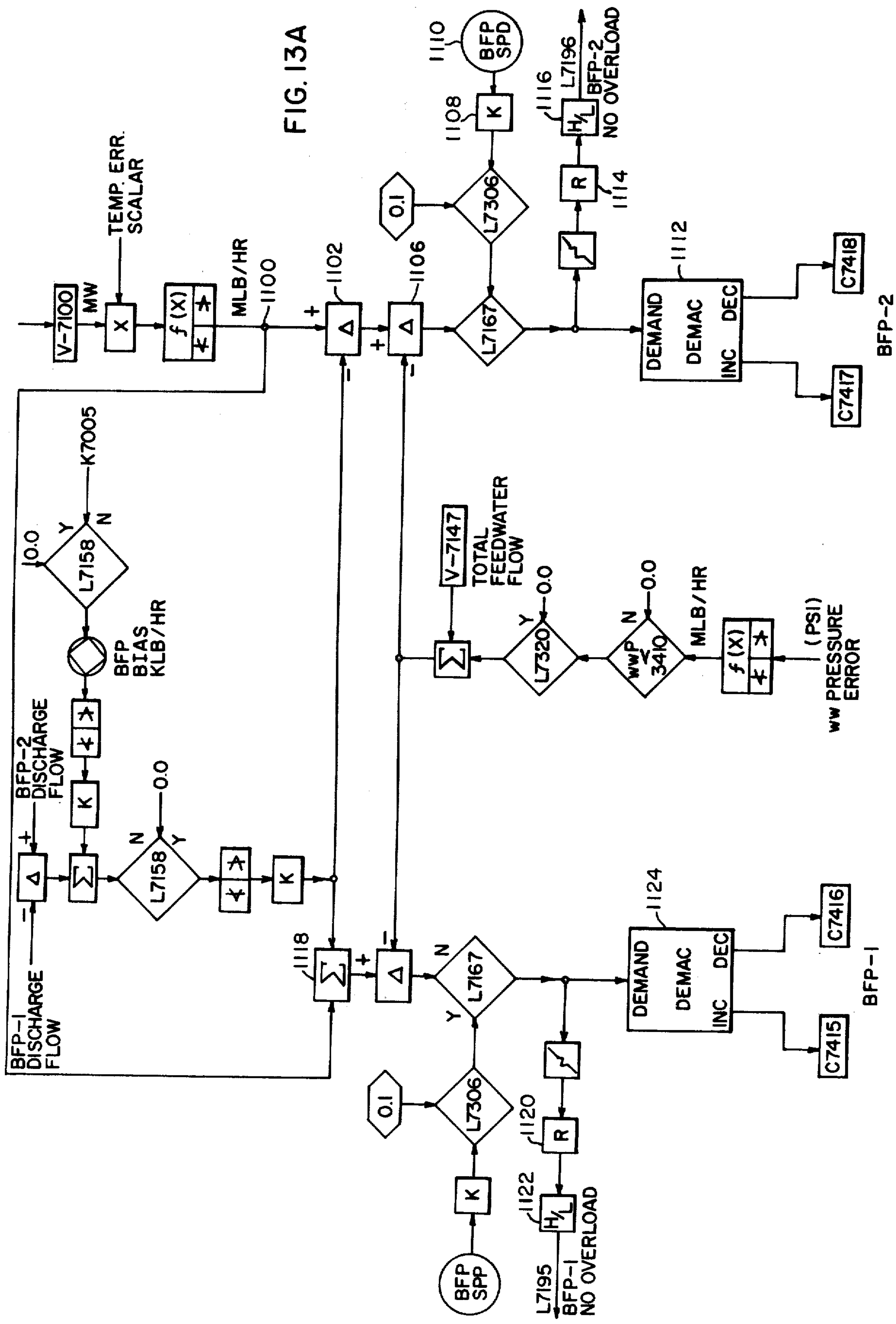
FIGS. 13A and 13B are schematic diagrams respectively of the feedwater portion and the temperature error portion of the boiler control, including an integrating controller and a ramp generator in accordance with the teachings of this invention.

In FIG. 13A, there is shown a portion of the boiler control circuit for controlling feedwater by operating the boiler feedwater pumps 1 and 2 in accordance with the plant load demand. A detailed description of the plant unit master for providing the plant load demand or reference is explained in detail in the abovenoted application, incorporated herein by reference. In particular, a pair of ramp generators 1114 and 1120, each implemented according to the circuit of FIG. 15B, are used to detect the variation of the load demand reference applied to the boiler feed pumps. The plant load demand is directed along path 1100 to be separated and applied to a difference block 1102 and to a summing block 1118, whereby a biasing signal may be applied to the reference demand through a pushbutton on the operator's panel. The difference signal derived from the block 1102 is compared in a difference block 1106 with a measured indication of pump seed as entered through blocks 1110 and 1108. In turn, the output of the difference block 1106 is applied to a DEMAC 112, which applies a pulse modulated signal to the boiler feed pump (2), whereby its position is set in accordance with the biased demand reference. The ramp generator 1114 is connected to the input of the DEMAC 1112 to provide a ramping signal, as explained above with respect to FIG. 15B, as the reference varies to provide an output through a high-low limiter 1116 to be used in logical circuits for detecting a limit condition of the boiler feedwater pump. The limit conditions of the first feedwater pump are detected by the ramp generator 1120, the output of which is applied through the high-low limiter 1122 to provide a flag indicative that the pump's limits have been exceeded.

Figure 13B:
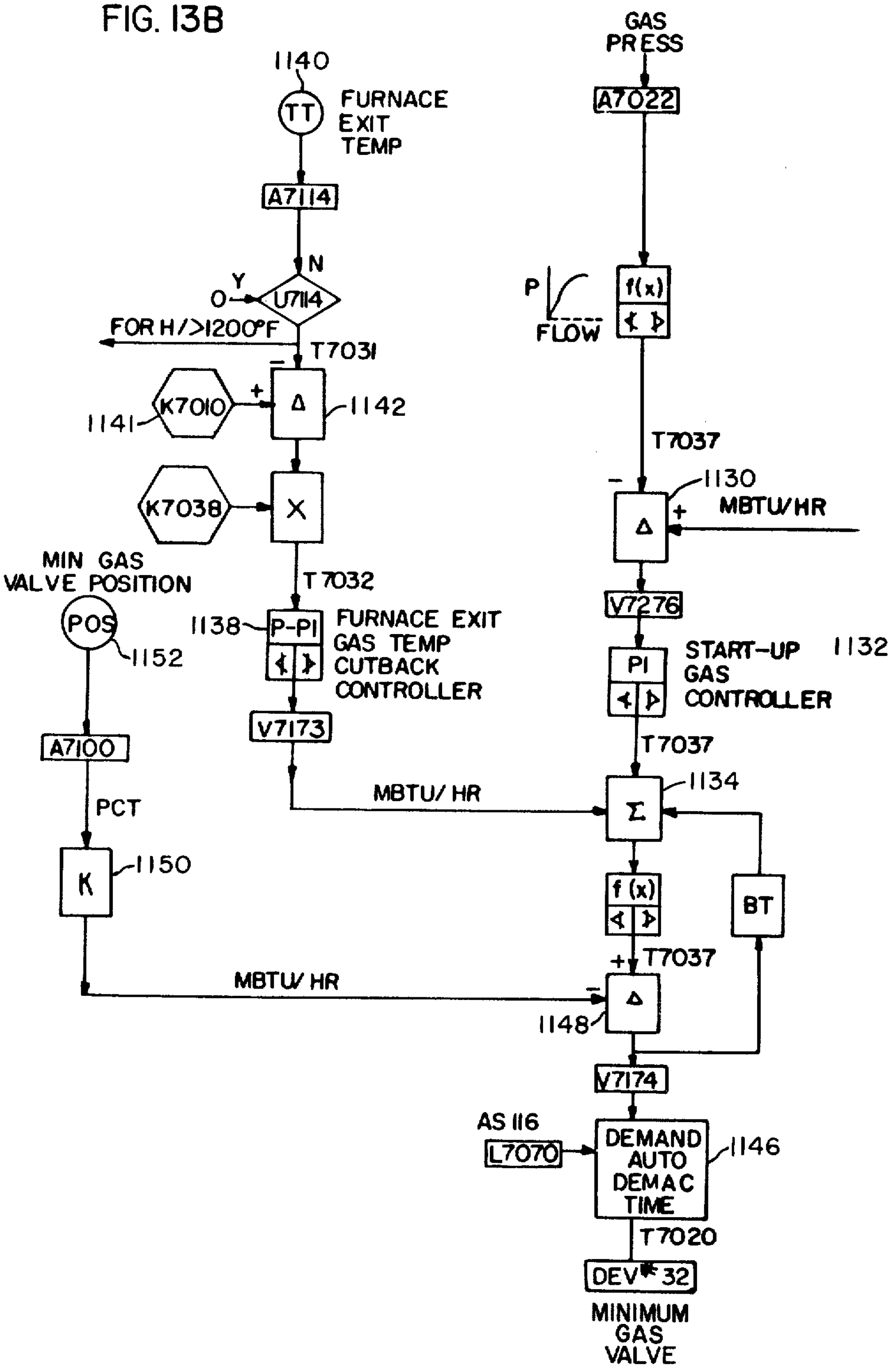

In FIG. 13B, there is shown a temperature error portion of the boiler control in which there is incorporated a PI controller 1132 in accordance with that previously shown and described with respect to FIG. 10, and further, a P-PI controller 1138 in accordance with that shown and described with respect to FIG. 15A. The circuit of FIG. 13B responds to the plant load demand as applied through a difference block 1130 to the PI controller 1132 to be modified in accordance with an index, e.g. the plant load reference, and then summed in block 1134 with a difference signal indicative of the difference between the maximum temperature as set by block 1144 (e.g. in the order of 1000°F) and that temperature measured at the furnace exit by temperature sensing device 1140. The difference signal derived from block 1142 is applied to the P-PI controller 1138 to provide an offset against which the minimum gas valve is to be operated. In particular, the output of the controller 1138 is applied through a proportional block 1136 to be summed with the output of the PI controller 1132 in the block 1134; the output of the summation block 1134 is applied to a DEMAC 1146 whose pulse modulated output controls the setting of the minimum gas valve to reduce the introduction of fuel to prevent overheating at the furnace exit. In a manner similar to that described with respect to FIG. 10, the offset output of the PI controller 1132 is processed in accordance with a variable gain and time constant entered through function generators in accordance with the plant load reference.

Figure 14A:
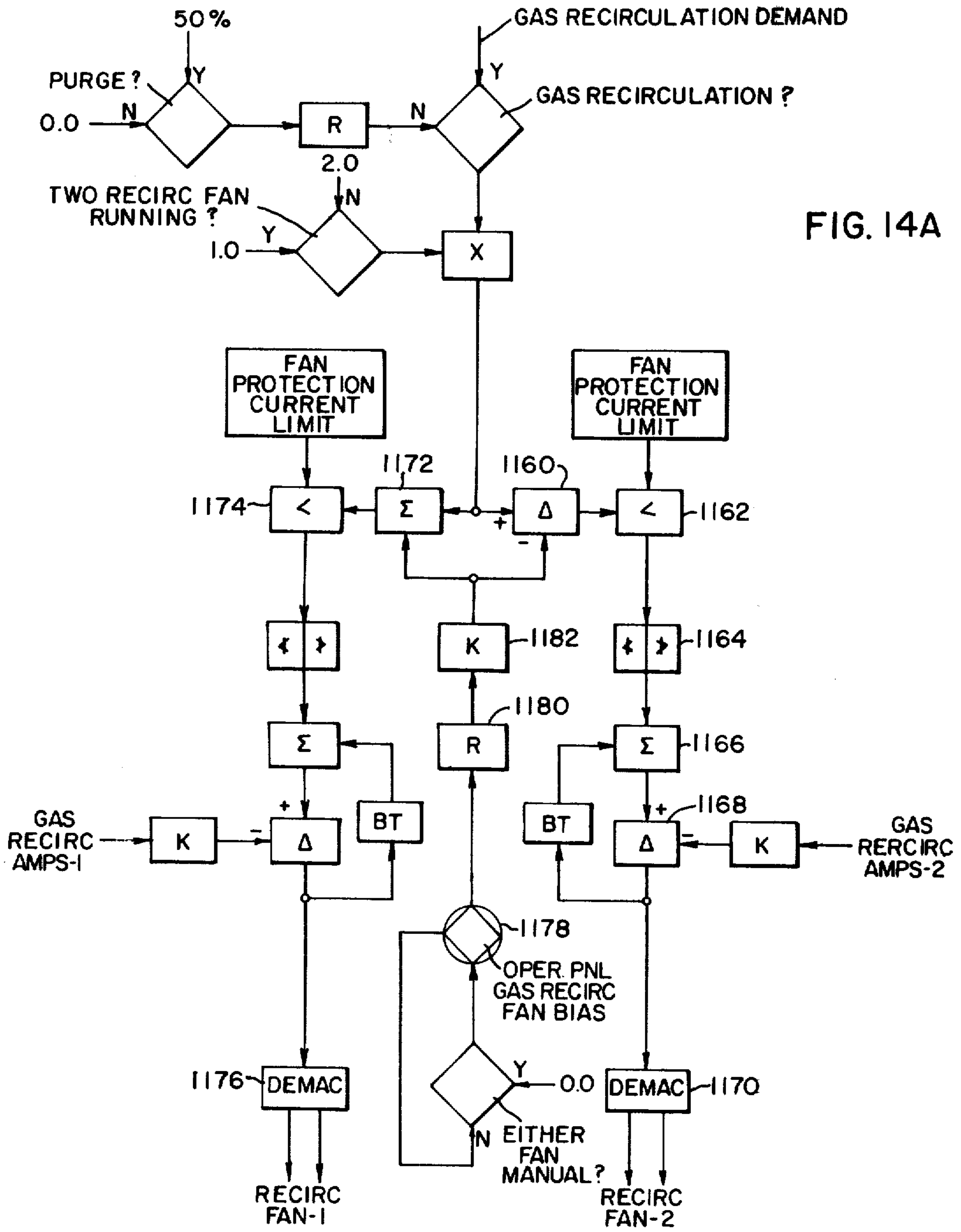
FIGS. 14A, 14B and 14C are schematic diagrams of the gas recirculation, reheat and superheat control portions of the boiler control, including the ramp generator and the integrating controller in accordance with the teachings of this invention.

In FIG. 14A, there is shown a circuit for controlling the recirculation of gas within the boiler burner by selectively energizing the recirculation fans 1 and 2 through their DEMACs 1176 and 1170. Generally, the load demand is applied through a difference block 1160, a low limiter 1162, a high-low limiter 1164, a summation block 1166 and a difference block 1168 to the DEMAC 1170 to control the operation of the recirculation fan (2), and along a similar path including the summation block 1172 and a low limiter 1174 to the DEMAC 1176 to control the operation of the recirculation fan (1). The ramp generator shown in FIG. 15B, is incorporated as the ramp generator 1180, whereby a gas recirculation fan bias as entered by pushbutton 1178 on the operator's panel is applied gradually through the proportional block 1182 to be subtracted from the load demand in difference block 1160 and to be added to the load demand in summation block 1172. As explained above with regard to FIG. 15B, the ramp generator is effective to enter a reference value linearly at a given rate, independent of the magnitude of the reference value.

Figure 14B:
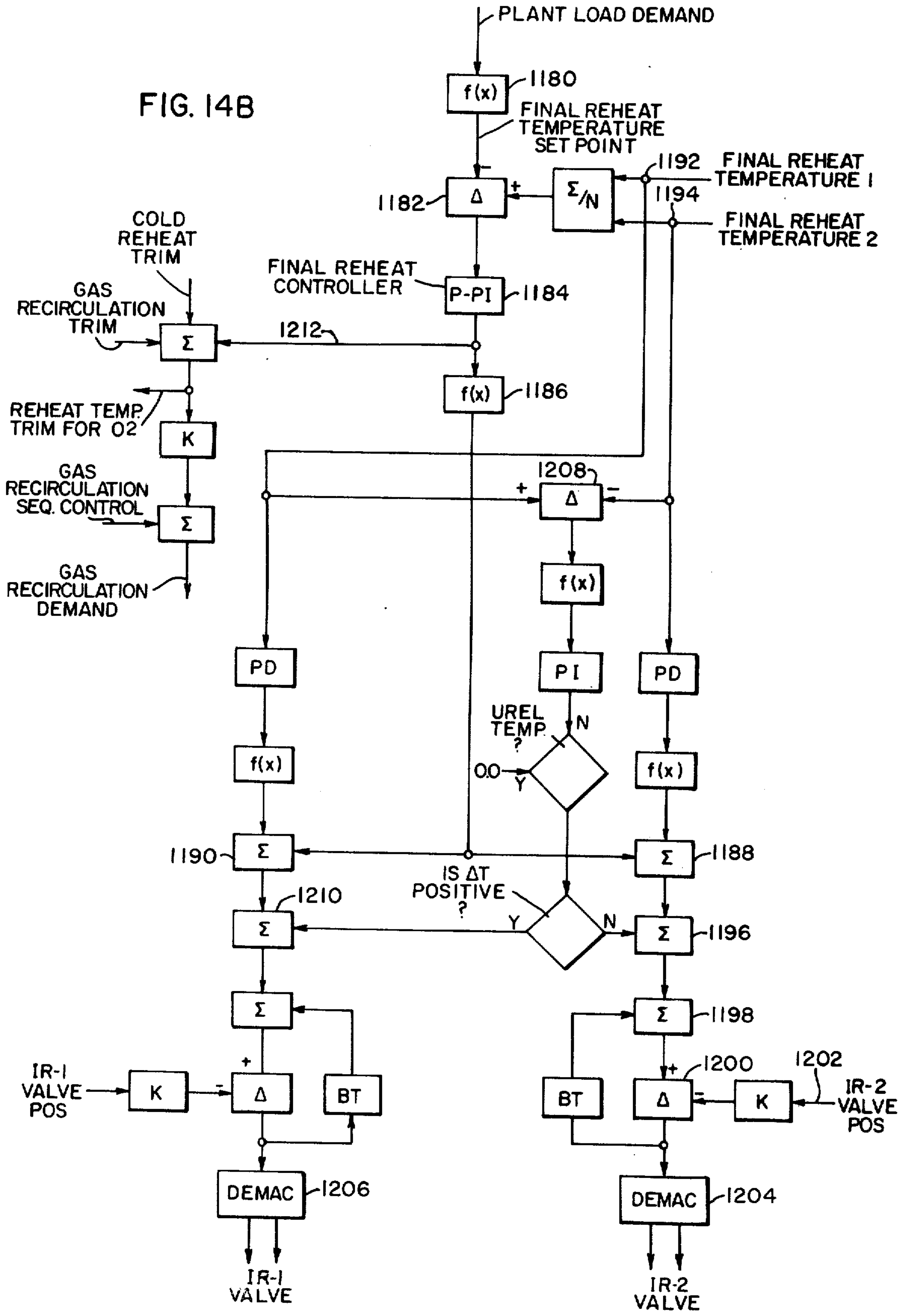

In FIG. 14B, there is shown a reheat control circuit whereby the operation of the first and second reheat valves are operated to direct a coolant into various portions of the reheater in a manner that a balanced temperature is maintained in the reheater as measured by the temperature sensors 1192 and 1194. Generally, the plant load reference is applied to a difference block 1182 to be compared with an indication of temperature as provided by two final reheat temperature sensors. The temperature error as derived from the difference block 1182 is applied to a P-PI controller 1184 implemented in accordance with FIG. 15A. The output of the P-PI controller 1184 is applied to each of a pair of summation blocks 1188 and 1190 to be summed with a temperature reference. In turn, if a temperature difference is sensed, an additional bias will be applied by summation blocks 1196 and 1210, whereby the reheat valves are operated through their DEMACs 1204 and 1206 to spray cooling water into various portions of the boiler to obtain a temperature balance. The P-PI controller 1184 is inserted into the reheat control circuit of FIG. 11B to avoid possible undesired interaction between the P-PI integratinc controller 1184 and the further processes to be carried out in the gas recirculation control circuit as shown in FIG. 14A; in particular, the output of the P-PI controller 1184 is applied along the path 1212 to the gas recirculation control circuit. In a manner similar to that explained above with regard to FIG. 15A, the P-PI controller 1184 may be operated by disposing its switch $S_1$ open to avoid any undesired interaction between the gas recirculation control circuit and the P-PI controller 1184.

Figure 14C:
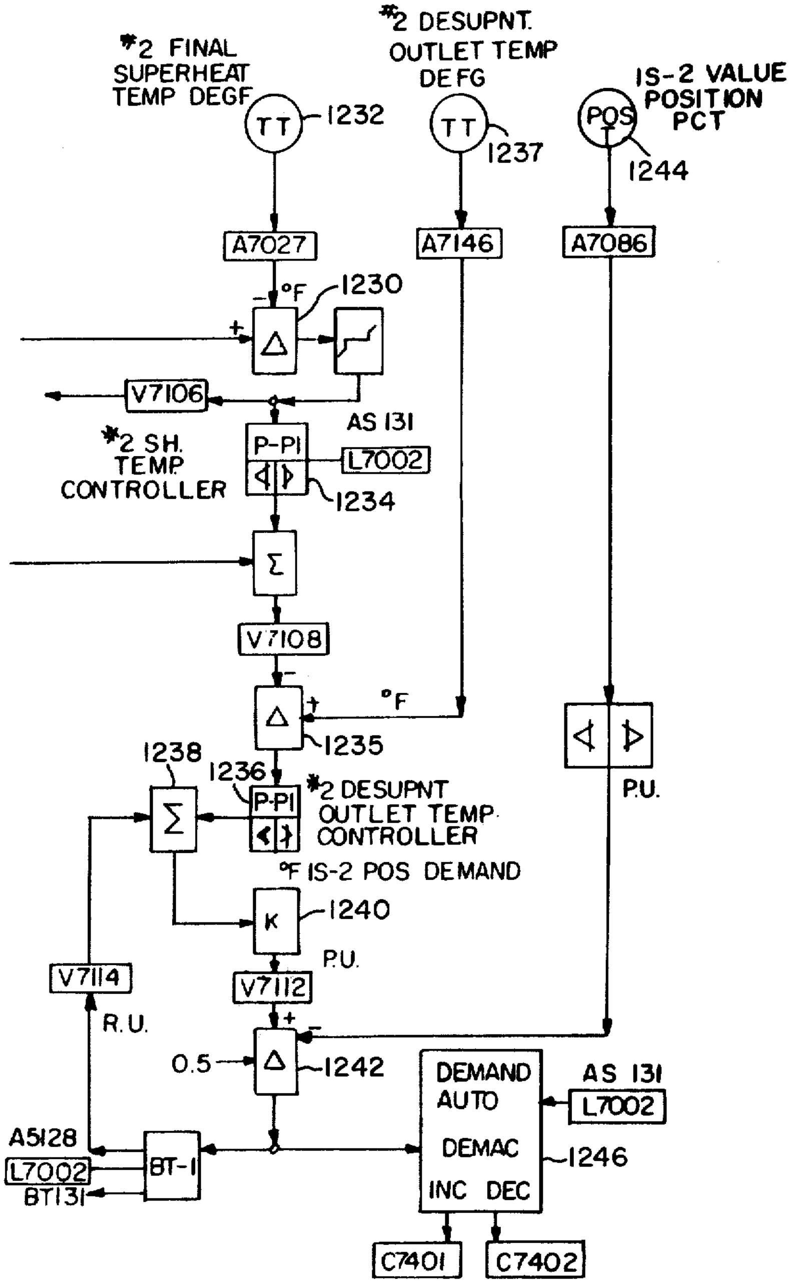

In FIG. 14C, the superheat control circuit is shown having incorporated therein a P-PI controller 1234 and a second P-PI controller 1236 connected in cascade; the controllers 1234 and 1236 are of the type shown in FIG. 15A. Generally, the superheat circuit operates in response to the demand load reference to operate the superheat valves to spray a cooling liquid whereby the temperature of the superheater may be cooled. As shown in FIG. 14C, the load demand in terms of temperature is successively compared with the final superheat temperature and the desuperheater outlet temperature in difference blocks 1230 and 1237, respectively. The controller 1234 and 1236 are particularly adapted to be connected in cascade as explained above; in particular, during calibration in Manual Mode, their switches $S_1$ may be opened whereby the error signal is applied to their proportional circuits. In effect, the operator critically calibrates the controllers in terms of their gain and time constants so that there will be no undesired interaction therebetween.

Figure 7A:
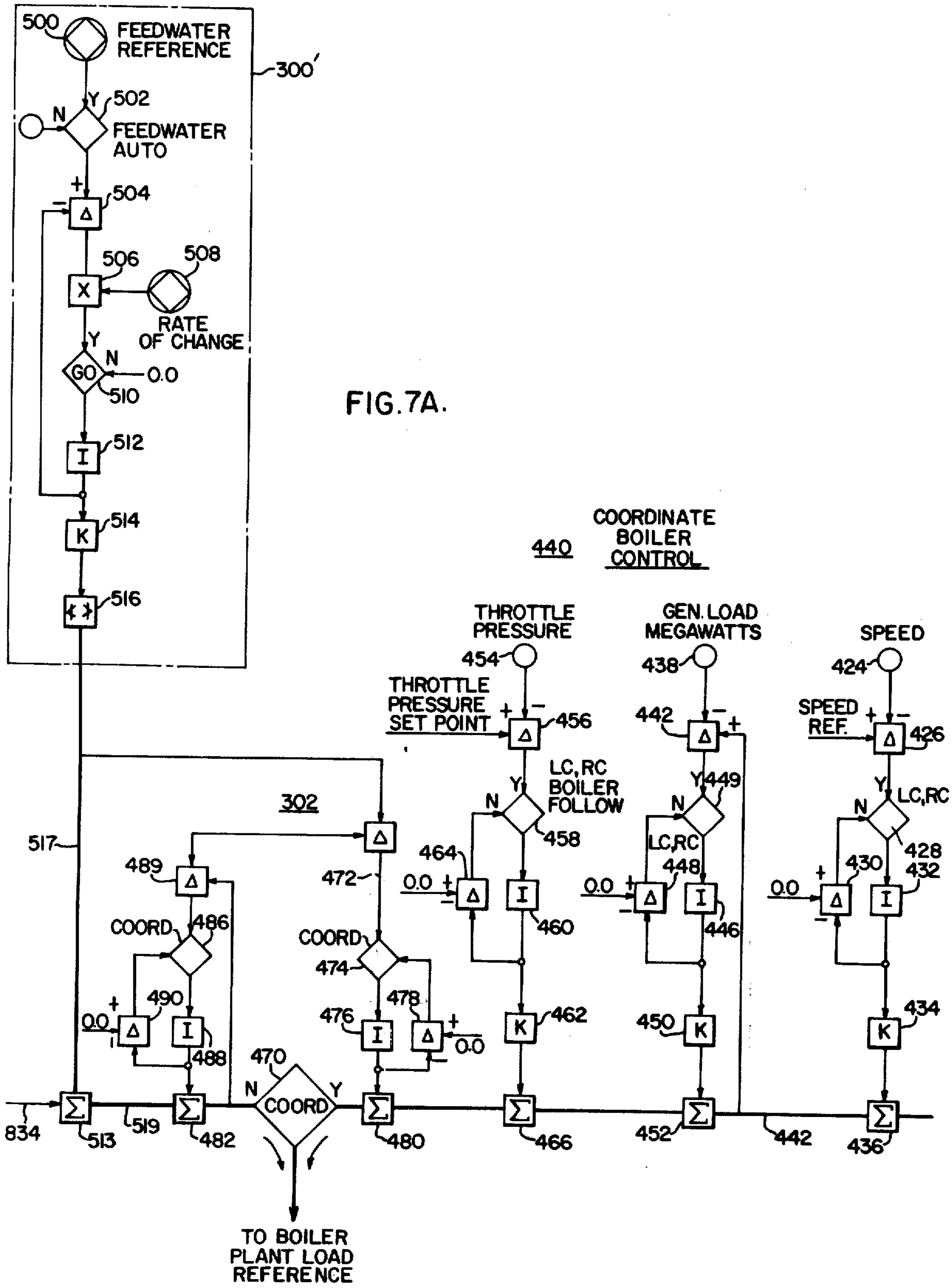
FIG. 7 is a schematic diagram of the plant unit master showing in detail the control flow and application of the plant load reference to the boiler and turbine controls when operating in a coordinated fashion, and the manner in which the feedwater reference and the turbine speed/load reference are applied, respectively, to the boiler and turbine controls whem operating in a non-coordinated fashion.
Figure 7B:
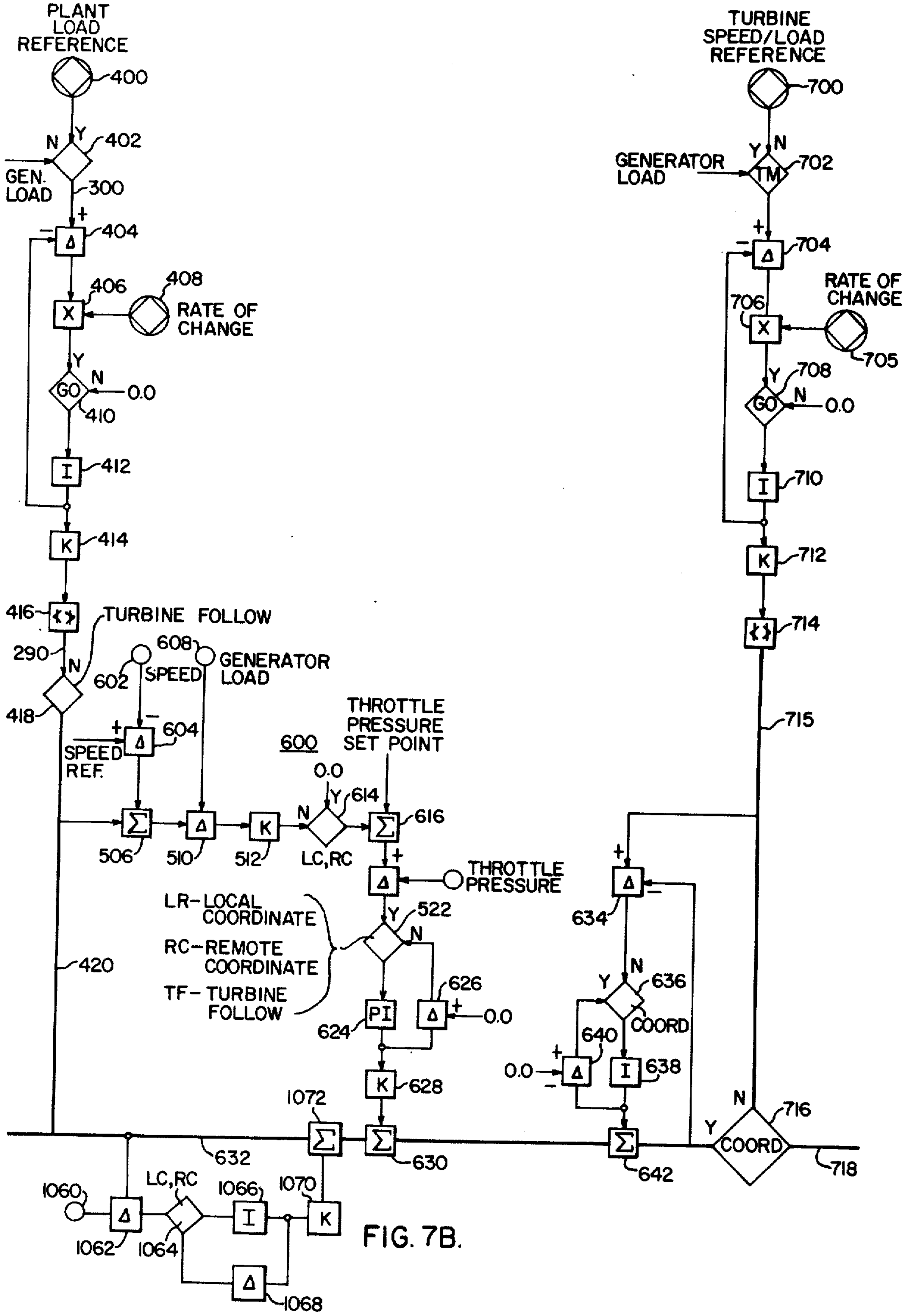
Figure 8:
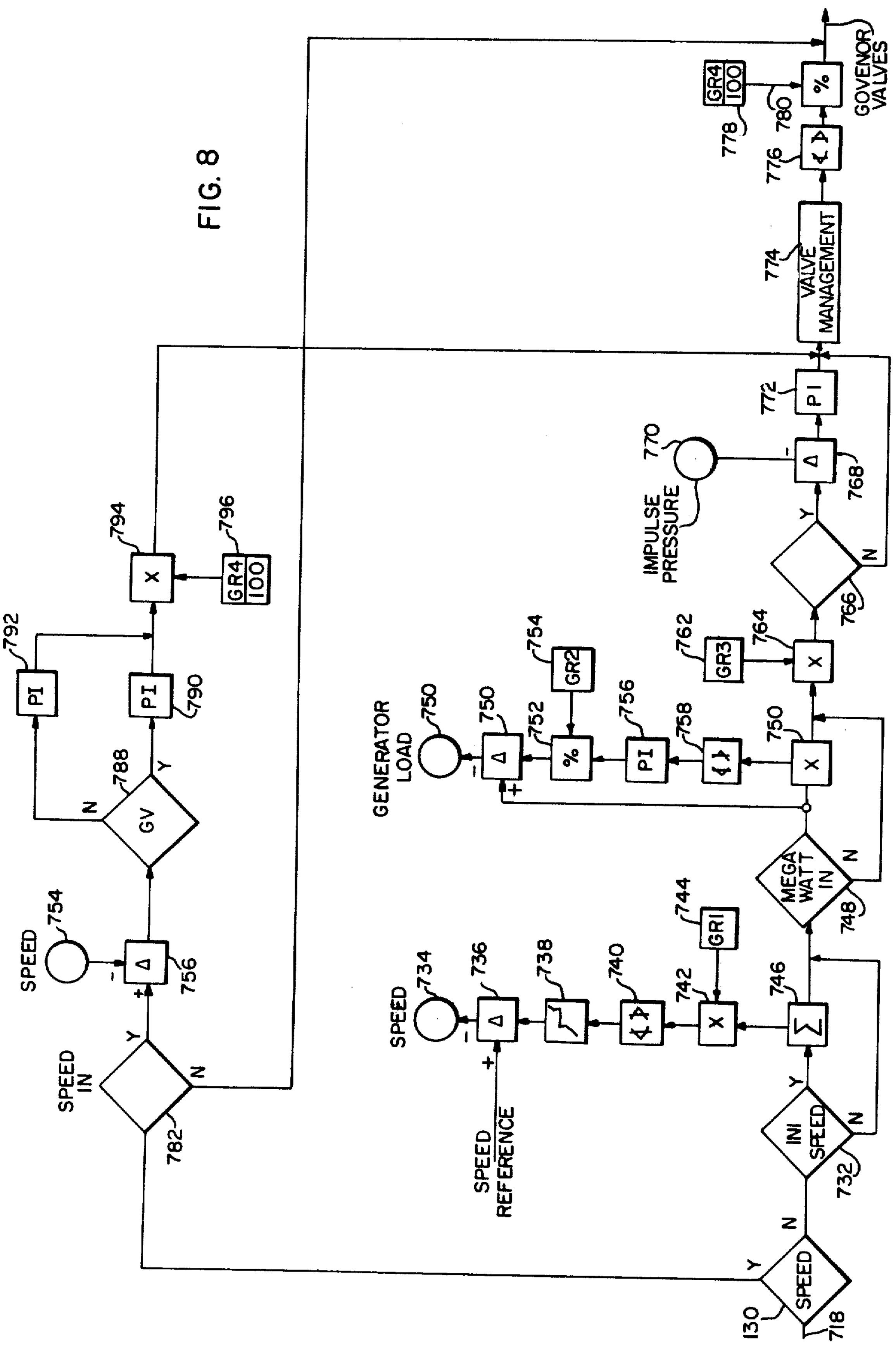
FIG. 8 shows a schematic diagram of the digital electrohydraulic control responsive to the modified load demand reference derived from the plant unit master as shown in FIG. 7, for controlling the valves employed in the turbine included in the electric power plant of FIG. 1A.

In the implementation of the plant unit master as shown in FIGS. 7 and 9, and the digital electrohydraulic valve control as shown in FIG. 8 and as described in detail in the above-identified application entitled "Plant Unit Master Control For Fossil Fired Boiler Implemented With A Digital Computer", there are numerous integrating controllers incorporated to process a difference or error signal. Typically, an error signal is developed as the difference between a reference signal and a measured variable of the power generating plant. For example, in FIG. 7A, the integrating controller as shown in block 432 integrates an error signal representative of the difference between a speed reference and the measured speed of the turbine rotor. This error signal is applied to the integrating controller 432 which, in either of the coordinated modes, integrates the error signal to provide an output applied to trim or to modify the plant load reference as explained in detail therein. When the plant unit master is disposed from one of its coordinated modes to another mode, for example Boiler Follow, a zero reference level signal is applied through the decision block 428 to the input of the integrating controller 432, whereby the output of the integrating controller 432 is driven toward zero, in an exponential manner, for example. In the transition stage between one mode and the next, it is desired to make the transition smoothly so that a bumpless transfer may be made. To achieve a smooth, bumpless transfer, the integrating controller, as readily implemented in a computer, operates at a relatively slow time constant. On the other hand, when the integrating controller 432 is operative to integrate the speed error signal to effect a trim of the plant load reference, it is desirable to provide a relatively fast time constant, whereby a positive response to the error signal is effected to ensure tight control over the plant load reference so modified. In this instance, a relatively fast constant is inserted into the process represented by the integrating controller 432. Though explained with regard to the speed control loop, it is understood that the control loops responsive to power errors and throttle pressure errors, include similar integrating controllers in which varying time constants and/or gains may be set dependent upon the mode of operation being carried out by that controller.

The integrating controllers as shown in FIG. 7 may be implemented readily with software techniques to improve the basic control. A significant improvement results from the flexibility provided by a software computer, as described above in detail, whereby the various constants or gains may be recalibrated from the operator's panel to permit a particular control process to be critically tuned. In the analog prior art systems, only a limited number of such integrating controllers could be used in that their expense was relatively high and further, such analog controllers required extensive calibration, thereby making it prohibitive in terms of operator time for such a system to include a relatively large number of integrating controllers.

As a review of FIGS. 7, 8 and 9 reveals, the integrating controllers may take various forms dependent upon their position within the overall control system. For example, the integrating controller 624 is incorporated in the plant unit master to provide a trim of the plant load reference applied to the digital electrohydraulic valve control system shown in FIG. 8, may be a proportional plus reset controller (P-PI) as shown in FIG. 15A. Further, the integrating controllers 446 and 460 of the power control loop and the throttle pressure control loop may illustratively take the form of the P-PI controller shown in FIG. 15A. Though not shown in FIG. 7, the proportional plus reset controller of FIG. 15A is particularly adapted to be used in a control process wherein two integrating controllers are disposed in cascade. Generally, the control procedure is to modify the proportional plus reset controller as shown in FIG. 15A in accordance with a defined logical condition, whereby the input signal is transferred away from the integral portion of the controller by switch $S_1$, when required to be operated in series with a second integrator. For example, when the switch $S_1$ is set open, the operator can calibrate the system so that the manual tracking of the cascaded network is improved.

Problems arise where two integrating-type controllers are inserted in-series with each other due to oscillating signals that develop. For example, in a manual/automatic station as incorporated into a boiler control system, where an operator sets a reference for the setting of valves through a bumpless transfer to the valve drive mechanism. Typically, in such valve control systems, the reference set by the operator is compared with a signal derived from a valve transducer indicative of the valve position to provide an error signal to be applied through the bumpless transfer and a summing block to an integrator. In typical fashion, the integrator provides an output for the direct control of the valve drive mechanism. In the Manual Mode of operation, there arises a potential problem because the integrator included within the bumpless transfer, is disposed in series with the first-mentioned integrator connected to the valve drive mechanism. Under such conditions, the $S_1$ switch as shown in FIG. 15A is opened to permit the error signal to be processed only by the proportional block 1100 of the integrator, the output of which in turn is applied to the valve drive mechanism.

In a normal mode, with switch $S_1$ closed, an input $x(t)$, typically an error signal, is applied through the switch $S_1$ to the integrator 1102, the output of which is summed with that derived from the proportional block 1100. The output of the summer 1104, in turn, is applied through the limiter 1106 to provide an output $y(t)$ of the controller, e.g. controller 624. If the P-PI controller of FIG. 15A is in its true condition and the switch $S_1$ is closed, the following output $y(t)$ is obtained:

$$y(t) = K(n) + y(t-1) + \frac{\Delta t}{2T}[x(t) + x(t-1)],$$

where $\Delta t$ is the sampling period of the computer and $T$ is the time constant of the P-PI controller. According to this algorithm, the error input $x(t)$ is integrated to provide an output having a corrective control over the process, e.g. to apply a trim factor to the plant load reference as a function of throttle pressure, as in FIG. 7. The values of the time constant $T$, the sampling interval $\Delta t$ and the constant $K$ of the proportional block 1100 are set into the computer program by the operator for ready calibration of the P-PI controller 624.

With respect to the operation of the P-PI controller 624 in the plant unit master, it is seen that in a Local Coordinated Mode, Remote Coordinated Mode or Turbine Follow Mode, the P-PI controller 624 as shown in FIG. 15A will act in a normal manner to integrate, according to the equation given above, the input throttle pressure error signal to trim the load reference. However, when the plant unit master is transitioned to its Boiler Follow Mode, a zero reference signal as derived from the reference level signal will be applied to the input of the P-PI controller 624, whereby the controller 624 will be driven toward zero along a linear ramp. In particular, during the transition, the switch $S_1$ is opened, whereby the zero reference signal is applied only to the proportional block 1100. In turn, the output of the proportional block 1100 is summed with the output of the integrator 1102, which is driven toward zero along a linear ramp. As shown in FIG. 7, it is noted that the P-PI controller 624 is made a part of the turbine control portion of the plant unit master. Typically, it is desired to operate the turbine control is a more positive, specific manner than that needed for the boiler control. As a result, the P-PI controller 624 responds in a linear fashion as opposed to an exponential fashion, whereby a specific change in the control operation is effected with a defined period of time at a defined rate. Such a time period and rate are determined by the constant $K$ of the proportional block 1100 as set forth above in the equation and can be set into the control program by the operator from his panel for the particular process to be carried out.

The computer implementation, as described above in detail, of the plant unit master enables the operator to insert time constants which have been calculated for the particular process under control. For example, the control processes of the turbine are generally faster than those carried out in the boiler control. As a result, it is desired to insert time constants for the integrating controllers 428, 444 and 464 that are generally slower than those incorporated for the integrating controller 622 of the throttle pressure control loop or integrating controller 1106 of the power control loop effecting turbine control. Illustrative values for the various time constants are given below:

| Coordinated Boiler Control | |
|---|---|
| Speed Control Loop (Integrating Controller 432) | Power Control Loop (Integrating Controller 446) |
| 10–15 seconds | 5–10 seconds |
| Throttle Pressure Control Loop (Integrating Controller 460) 15–25 seconds | |
| Coordinated Turbine Control | |
| Throttle Pressure Control Loop (P-PI Controller 626) | Power Control Loop (Integrating Controller 1066) |
| 4–10 seconds | 5–10 seconds |

Though the time constants required for the boiler control may be three to thirty times longer than those required for the turbine control, it is noted that the constants are varied for the particular control loop whose control processes they effect; thus, the computer implementation is significant in that it permits the operator to readily calibrate the constants to fine-tune the particular control process. Though the adaptive controllers have been described herein with regard to the operation of a once-through boiler, it is realized that this invention is readily adapted to be used with various other types of boilers, including a drum-type and a subcritical, once-through boilers, as well as boilers produced by different manufacturers. Further, the prior art plant unit masters implemented by analog techniques are limited in their flexibility and in their use of integrating controllers so that two or more variables may be applied to a single analog integrator to be processed. As a result, the time constant for such an analog integrator is selected as a compromise between the requirements of the control processes for the distinct measured parameters. The plant unit master described herein uses separate control loops and separate integrating controllers which may be calibrated critically according to the particular measured parameter being processed.

Once the control integrators have been calibrated for each of the control loops of the Coordinated Boiler Control and the Coordinated Turbine Control, the plant unit master is capable of responding quickly to rapid changes of load demand. The Coordinated Turbine Control is calibrated to respond to a predetermined error to set the governor valves to 100 percent open within a very short period of time, e.g. 1 second. When the governor valves are opened, steam is quickly directed to the turbine, thereby rapidly increasing the power generated and in a sense, "borrowing" energy from the boiler. In a compensatory action, the Coordinated Boiler Control, and in particular its speed error control loop, integrates the time period that the governor valves have been opened to increase thereby the plant load reference applied to the boiler control, whereby increased input of fuel, air and water is applied to the boiler. As a result, the borrowed energy is replaced. In this manner, a plant unit master whose control loops have been calibrated finely can respond rapidly to increased load demands in an efficient manner.

Thus, by incorporating a P-PI controller as shown in FIG. 15A, the system may track faster than the prior art systems in that the system may be calibrated manually by disposing the switch $S_1$ open. Further, the effect of two integrators in-series is eliminated. The controller may be implemented readily in software techniques because of the simplified manual tracking and further may be applied to P+D (proportional plus derivative) and P+I+D (proportional plus integral plus derivative) controllers. As explained above, the controller is able to make a bumpless transfer because the output of its integral portion is forced to zero when the switch is open and the controller presents only the proportional block to the input signal.

As a further example of the manner in which the elements of the plant unit master may be selected with regard to its overall control operation, attention is turned to the Ramp Mode control as shown particularly in FIG. 9. In particular, the ramp generators 802 and 806 are selected so that feedwater reference is trimmed in a manner such that the value of feedwater reference will provide 3500 PSIG from the boiler. In particular, it is desired to ramp at a given rate toward an entered reference value, i.e. a value corresponding to 3500 PSIG.

This is accomplished by incorporating a ramp generator as shown in FIG. 15B for each of the ramp generators 802 and 806. In FIG. 15B, an input $x(t)$ corresponding to the reference level to which the ramp signal is to be driven is applied to a difference block 1120, the output of which is applied through a deadband block 1122 to a decision block 1124. If the output of the deadband block 1122 is positive, a YES decision is made by the block 1124, whereby an input is applied to the $+K$ proportional block 1128. In this situation whereby the error difference signal is positive, a constant, positive signal is applied to the integrating block 1132 whereby a positive ramp signal is generated, to be applied through the high-low limiter 1134 to provide the output $y(t)$. If the error of difference signal is not positive as decided by the decision block 1124, its output is applied to a decision block 1126, which provides an output to a $-K$ proportional block 1130. A negative, constant signal is applied to the integrator 1132, which generates a negative ramp signal to be applied through the high-low limiter 1134 to provide an output $y(t)$. AS shown in FIG. 15B, the output is fed back and is applied to the other input of the difference block 1120. As a result, when the output $y(t)$ equals the input $x(t)$, the output of the difference block 1120 is zero, thereby discontinuing either the positive or negative ramp. Thus, a control value may be entered at the input $x(t)$, toward which the ramping signal, either negative or positive, is directed at a fixed rate not dependent upon the value of the input signal. Upon reaching the input reference signal, the output $y(t)$ stops increasing and assumes a level value corresponding thereto. Though the embodiment explained with respect to FIG. 15B has been shown with proportional blocks 1128 and 1130 having the same value $K$, it is understood that differing values of $K$ could be incorporated into the ramp controller as shown in FIG. 15B by the controller from his operator's panel dependent upon the desired control function.

In general, the use of ramp controllers which move from one point to another in linear fashion is desirable from the point of integrator lead-off, when transferring from one mode of control to another, or assigning corrective signals to a control system that already is in service. The nature of the ramp as defined in the controller of FIG. 15B is moved in a linear fashion between two points at a fixed rate of change to dynamically shift the operation even if the input value changes direction or magnitude. The controller of FIG. 15B is implemented readily by software techniques whereby the rate of movement is calibrated and additionally, high-low limits may be readily imposed upon its output. By contrast, a corresponding circuit is not readily implemented by analog techniques. By implementing the control system as shown in FIG. 15B with computer software techniques, a ramp controller is provided such that prior to ramping, the output of the controller automatically assumes a position corresponding to that of the input variable for the beginning of the ramp. The point to which the control transition is to be made, i.e. the final target value, can be entered and the linear ramp started. At any point in time, the end target can be modified and the existing output of the ramp forms a coordinate point and a straight-line ramp will then occur to the new final target value.

The ramp controller as shown in FIG. 15B also is adapted for providing a corrective control signal to a system that already is in service, for example, a boiler control system. Analog-type boiler control systems typically employ analog integrators the output of which varies exponentially with time. At increasing values of time, the rate of change of the output becomes increasingly steep so that such analog integrators are not particularly suitable for boiler process control. This defect typically is compensated by employing analog integrators with very slow time constants whereby the response of the boiler control is made unduly slow. Thus, if it is desired to shift the load reference in an analog boiler controller, many minutes are required before even an initial response to the new reference is achieved. By contrast, ramp generators as shown in FIG. 15B as implemented in software techniques are capable of responding immediately in a predetermined, linear fashion, whereby a considerable load shift may be achieved in a known period of time, e.g. 30 megawatts within a single minute.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. A power control system including an integrating controller responsive to a first electrical input signal indicative of the difference between a reference value and a measured variable to provide a corrective output for effecting control of the variable, said integrating controller comprising:

a. an integrating circuit for integrating the first electrical input signal with a time constant T;
b. a proportional circuit for providing an output proportional to the first electrical input signal in accordance with a gain constant K;
c. a summing circuit responsive to the outputs of said integrating circuit and said proportional circuit to provide the corrective output; and
d. function generator means responsive to a second electrical input signal indicative of a system's control index for independently varying the gain K and the time constant T as a selected function of the system's control index.

2. The power control system as claimed in claim 1, wherein the output of said summing circuit is applied to a high-low limiter, the output of which provides the corrective output.

3. The power control system as claimed in claim 1, wherein said function generator means comprises first and second function generators, each responsive to the system's control index for varying, respectively, the gain K of said proportional circuit and the time constant T of said integrating circuit in accordance with the system's control index.

4. The power control system as claimed in claim 3, wherein at least one of said first and second function generators is calibrated according to a curve of the relationship between the values of the index and the variable to be controlled.

5. An electric plant control system including the integrating controller as claimed in claim 4, wherein there is included means for providing the index as a load demand reference, and the curve set into said function generator is calibrated in terms of power measurement units.

6. The power control system as claimed in claim 1, wherein said function generator means comprises a multiplying circuit for variably multiplying the first electrical input signal to provide an output to be applied to said proportional circuit and to said integrating circuit, and means for selectively applying a multiplying factor to said multiplying circuit dependent upon the system's control index.

7. The power control system as claimed in claim 1, wherein said function generator means comprises a multiplying circuit responsive to the input to provide an output multiplied by a factor and applied to each of said proportional circuit and said integrating circuit, and means operative in a first mode if the system's control index is above a given value to apply a first factor to said multiplying circuit and in a second mode if the system's control index is less than the given value to apply a second factor to said multiplying circuit.

8. The power control system as claimed in claim 7, wherein the second factor is unity.

9. The power control system as claimed in claim 1, wherein said function generator means comprises a first multiplier circuit responsive to the input to provide an output according to the input multiplied by a factor to be applied to said proportional circuit, first decision means operative in a first mode if the system's control index is above a first level to apply a first factor to said multiplying circuit and in a second mode if the system's control index is below the first level to apply a second factor to said multiplying circuit, a second multiplying circuit responsive to the input to provide an output according to the input multiplied by a factor to be applied to said integrating circuit, and second decision means operative in a first mode if the system's control index is above a second level to apply a third factor to said second multiplying circuit, and in a second mode if the system's control index is below the second level to apply a fourth factor to said multiplying circuit.

10. For use in power control systems, an integrating controller responsive to an input indicative of the difference between a reference value and a parameter to be controlled for providing an output to control the parameter, said integrating controller comprising:

a. a proportional circuit responsive to the input to provide a proportional output according to a gain K;

b. an integrating circuit having a time constant T and responsive to the input to provide an integrated output;

c. a summing circuit responsive to the outputs of said proportional circuit and of said integrating circuit to provide the controlling output; and d. switch means operative in a first mode in response to the presence of a first system's index to apply the input to said integrating circuit and in a second mode in response to the presence of a second system's index for disconnecting said input from said integrating circuit.

11. A control circuit including first and second integrating controller connected in cascade of the type claimed in claim 10, wherein there is included means for actuating said switch means of said first and second integrating controllers to their second mode, and means for calibrating the gain K and the time constant T, respectively, of said integrating circuits and proportional circuits of said first and second integrating controllers, whereby when said first and second integrating controllers are operative in their first modes, there will be no undesired interaction therebetween.

12. A system for controlling the power generation from a power plant including a boiler for supplying steam to a steam turbine and comprising first and second integrating controllers as claimed in claim 1, wherein said first integrating controller is associated with the control of said boiler and includes an integrating circuit having a first time constant, and said second integrating controller is associated with the control of said steam turbine and includes an integrating circuit with a second time constant less than said first time constant, whereby the control process of said turbine is effected in a relatively shorter time than that of said boiler.

13. A system for controlling in accordance with a power load demand the power generation of a power plant including a boiler for supplying steam to a turbine and comprising the integrating controller as claimed in claim 1, wherein there is included means for sensing the temperature of the steam to be controlled and for providing a temperature error signal indicative of the difference between the measured temperature and a reference temperature, and said setting means setting each of the gain K and the time constant T as a function of the power load demand.

14. A system for controlling the feedwater to a boiler associated with a turbine and an electrical generator and including the integrating controller of claim 1, wherein there is included means for measuring the waterwell output pressure of said turbine and said setting means sets the gain K proportional to a power load demand signal.

15. A system for controlling the operation of a boiler for a power plant, including the integrating controller as claimed in claim 10, wherein there is included means for measuring the temperature of an exhaust of a furnace associated with said boiler, difference means for providing a temperature error signal indicative of the difference between the measured temperature and a plant load reference signal to provide a difference signal to be applied to said integrating controller to control the spraying of cooling water into selected portions of said boiler, and there is further included a gas recirculation control circuit for controlling the recirculation of gas within the boiler burner, said switch means of said integrating controller being disposed to its open position to avoid undesirable interaction between said integrating controller and the gas recirculation control.

16. A system for controlling a boiler for supplying steam to a turbine, including the integrating controller as claimed in claim 1, wherein there is included means for measuring the speed of a rotor of said turbine, difference means for providing a first difference signal indicative of the difference between the measured speed and a speed reference signal, to be applied to said integrating controller, and summing means responsive to the output of said integrating controller and to a plant load reference signal for trimming the plant load reference signal in accordance with the output of said integrating controller.

17. The integrating controller as claimed in claim 16, wherein there is further include a second difference circuit responsive to the output of said integrating controller and to a reference signal for providing a second difference signal, and a decision block operative in a first mode for applying the first difference signal to the input of said integrating controller and operative in a second mode for applying the second difference signal to said input of said integrating controller.

18. The integrating controller as claimed in claim 17, wherein said decision means is operative in its first mode when the boiler control system is being operated in a coordinated mode of operation and in its second mode when operating in a non-coordinated mode of operation, whereby a bumpless transfer is effected between the two modes of operation.

19. In the control circuit as claimed in claim 11 adapted for the control of a power plant including a boiler for supplying steam to a turbine and a generator rotatively driven by said turbine, wherein there is included means for providing an electrical signal indicative of the power generated by said generator to be applied to said first integrating controller, and a first summing circuit responsive to the output of said first integrating controller and a plant load demand signal whereby the plant demand signal is trimmed; and means for measuring the throttle pressure of said boiler, and a difference circuit for providing a difference signal indicative of the difference between the measured and a reference value of the throttle pressure, said second integrating controller responsive to the second difference signal, and a second summing circuit responsive to the trimmed plant load demand signal as derived from said summing circuit and to the output of said second integrating controller for further trimming the plant load demand signal as a function of measured throttle pressure.

20. A system for controlling the position of governor valves associated with a turbine comprising said integrating controller as claimed in claim 10, and means for measuring throttle pressure, a first difference circuit for providing a first difference signal between the measured and a reference value of throttle pressure, said integrating controller responsive to the difference signal for trimming the plant load demand signal as a function of the measured throttle pressure.

21. The control system as claimed in claim 20, wherein there is included a second difference circuit for providing a second difference signal indicative of the difference between the output of said integrating controller and a reference level, and a decision circuit operative in a first mode for applying the first difference signal to said integrating controller and in a second mode to apply the second difference signal to said integrating controller.

22. The control system as claimed in claim 21, wherein when said decision circuit is operative in its second mode, said switch means is operative in its second mode, whereby the reference signal is applied only to said proportional circuit to provide a substantially linear output from said integrating controller.

23. An integrating controller responsive to an input indicative of the difference between a reference value and a measured, system's variable to provide a corrective output for effecting control of the variable, said integrating controller comprising:

a. integrating means for integrating the input with a time constant T;
b. proportional means for providing an output proportional to the input in accordance with a gain constant K;
c. summing means responsive to the outputs of said integrating means and said proportional means to provide the corrective output;
d. first and second function generator means, each responsive to a system index independent of the input for providing, respectively, signals indicative of the gain K and the time constant T to said integrating means and said proportional means in accordance with first and second functions, respectively.

24. The integrating controller as claimed in claim 23, wherein said first and second functions are distinct from each other.

25. The integrating controller as claimed in claim 23, adapted for use in a power generating control system, wherein the system index is a power generating load demand signal independent of the measured variable.

26. An integrating controller responsive to an input indicative of the difference between a reference value and a measured, system's variable to provide a corrective output for effecting control of the variable, said integrating controller comprising:

a. integrating means for integrating the input with a time constant T;
b. proportional means for providing an output proportional to the input in accordance with a gain constant K;
c. summing means responsive to the outputs of said integrating means and said proportional means to provide the corrective output;
d. multiplying means for variably multiplying the input to provide an output to be applied to said proportional means and to said integrating means; and
e. means operative in a first mode for applying a first multiplying factor to said multiplying means and in a second mode for applying a second multiplying factor to said multiplying means, said applying means operative in the first mode if the system index is above a predetermined level and in the second mode if the system index is below the predetermined level.

27. An integrating controller responsive to an input indicative of the difference between a reference value and a measured, system's variable to provide a corrective output for effecting control of the variable, said integrating controller comprising:

a. integrating means for integrating the input with a time constant T;
b. proportional means for providing an output proportional to the input in accordance with a gain constant K;
c. summing means responsive to the outputs of said integrating means and said proportional means to provide the corrective output;
d. first multiplier means responsive to the input to provide an output according to the input multiplied by a factor to be applied to said proportional means;
e. first decision means operative in a first mode if a system's index is above a first level to apply a first factor to said first multiplying circuit and in a second mode if the index is below the first level to apply a second factor to said first multiplying circuit;
f. second multiplying means responsive to the input to provide an output according to the input multiplied by a factor to be applied to said integrating means; and
g. second decision means operative in a first mode if the index is above a second level to apply a third factor to said second multiplying means and in a second mode if the index is below the second level to apply a fourth factor to said second multiplying means.

28. An integrating control responsive to an electrical input signal indicative of the difference between a reference value and a measured, system's variable to be controlled for providing an output to control the variable, said integrating controller comprising:

a. proportional means responsive to the electrical input signal for providing an output according to a gain K;
b. integrating means having a time constant T and responsive to the input to provide an integrated output;
c. summing means responsive to the outputs of said proportional means and of said integrating means to provide the controlling output; and
d. switch means operative in a first mode in response to the presence of a first system's control index to apply the input to said integrating means, and in a second mode in response to the presence of a second system's control index for disconnecting the input from said integrating means.

* * * * *